US009827971B2

United States Patent
Suzuki

(10) Patent No.: US 9,827,971 B2
(45) Date of Patent: Nov. 28, 2017

(54) VEHICLE WITH AN ENERGY SOURCE SUPPLY PORTION

(75) Inventor: Naoto Suzuki, Fujinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 570 days.

(21) Appl. No.: 13/137,303

(22) Filed: Aug. 4, 2011

(65) Prior Publication Data

US 2011/0315461 A1 Dec. 29, 2011

Related U.S. Application Data

(63) Continuation of application No. 12/449,577, filed as application No. PCT/JP2008/065233 on Aug. 20, 2008, now abandoned.

(30) Foreign Application Priority Data

Aug. 24, 2007 (JP) .................................. 2007-218284

(51) Int. Cl.
*B60K 6/36* (2007.10)
*B60W 20/00* (2016.01)
(Continued)

(52) U.S. Cl.
CPC .............. *B60W 20/00* (2013.01); *B60K 6/28* (2013.01); *B60K 6/365* (2013.01); *B60K 6/40* (2013.01); *B60K 6/445* (2013.01); *B60L 11/123* (2013.01); *B60L 11/14* (2013.01); *B60L 11/182* (2013.01); *B60L 11/1818* (2013.01); *B60L 11/1877* (2013.01); *B60W 10/26* (2013.01); *B60K 2001/0416* (2013.01);

*Y02T 10/6217* (2013.01); *Y02T 10/6239* (2013.01); *Y02T 10/6269* (2013.01); *Y02T 10/6278* (2013.01);
(Continued)

(58) Field of Classification Search
None
See application file for complete search history.

(56) References Cited

U.S. PATENT DOCUMENTS 5,202,617 A    4/1993   Nor
5,677,604 A   10/1997   Masaki et al.
(Continued)

FOREIGN PATENT DOCUMENTS

DE    44 31 929 C1    10/1995
DE    196 39 904 A1    5/1997
(Continued)

OTHER PUBLICATIONS

Sep. 27, 2011 Office Action issued in Korean Patent Application No. 10-2010-7006372 (with English translation).
(Continued)

*Primary Examiner* — Erez Gurari
(74) *Attorney, Agent, or Firm* — Oliff PLC

(57) ABSTRACT

A vehicle is a hybrid vehicle including an engine driven by fuel, and the vehicle includes a motor-generator driven by electric power and a charge plug to which a connector is removably connected, the charge plug being capable of at least one of being supplied with electric power from the connector and supplying electric power to the connector. An engine is arranged to be offset toward one side surface and the charge plug is provided in the other side surface.

11 Claims, 15 Drawing Sheets

(51) Int. Cl.
  *B60K 6/365* (2007.10)
  *B60K 6/40* (2007.10)
  *B60K 6/445* (2007.10)
  *B60L 11/12* (2006.01)
  *B60L 11/14* (2006.01)
  *B60L 11/18* (2006.01)
  *B60W 10/26* (2006.01)
  *B60K 6/28* (2007.10)
  *B60K 1/04* (2006.01)

(52) U.S. Cl.
  CPC .......... *Y02T 10/7005* (2013.01); *Y02T 10/705* (2013.01); *Y02T 10/7072* (2013.01); *Y02T 10/7077* (2013.01); *Y02T 90/122* (2013.01); *Y02T 90/14* (2013.01)

(56) References Cited

U.S. PATENT DOCUMENTS

| | | | |
|---|---|---|---|
| 5,757,595 | A | 5/1998 | Ozawa et al. |
| 6,963,186 | B2* | 11/2005 | Hobbs .......................... 320/128 |
| 7,265,455 | B2* | 9/2007 | Oyobe et al. ................. 290/1 R |
| 7,398,844 | B2* | 7/2008 | Ishikawa et al. ........ 180/65.285 |
| 7,550,861 | B2* | 6/2009 | Oyobe et al. ................. 290/40 C |
| 7,654,349 | B2* | 2/2010 | Lee et al. ...................... 180/53.8 |
| 2002/0057582 | A1 | 5/2002 | Nakayama et al. |
| 2004/0251858 | A1 | 12/2004 | Asao et al. |
| 2005/0029870 | A1 | 2/2005 | Aridome |
| 2006/0113798 | A1 | 6/2006 | Oyobe et al. |
| 2006/0250902 | A1 | 11/2006 | Bender et al. |
| 2007/0158120 | A1 | 7/2007 | Lee et al. |
| 2007/0171689 | A1 | 7/2007 | Ishikawa et al. |
| 2008/0190680 | A1* | 8/2008 | Kaneko et al. ............... 180/170 |
| 2009/0024267 | A1 | 1/2009 | Kawai |
| 2009/0040068 | A1* | 2/2009 | Oyobe et al. .............. 340/932.2 |

FOREIGN PATENT DOCUMENTS

| | | |
|---|---|---|
| EP | 2 116 405 A1 | 11/2009 |
| FR | 2 746 352 | 9/1997 |
| JP | A-4-334906 | 11/1992 |
| JP | A-7-112620 | 5/1995 |
| JP | A-7-193910 | 7/1995 |
| JP | A-8-154307 | 6/1996 |
| JP | A-9-285022 | 10/1997 |
| JP | A-11-122711 | 4/1999 |
| JP | A-11-146502 | 5/1999 |
| JP | A-11-299008 | 10/1999 |
| JP | A-11-318004 | 11/1999 |
| JP | A-2000-253511 | 9/2000 |
| JP | B2-3263075 | 3/2002 |
| JP | A-2002-374604 | 12/2002 |
| JP | A-2004-9863 | 1/2004 |
| JP | A-2004-332744 | 11/2004 |
| JP | A-2004-358994 | 12/2004 |
| JP | A-2005-053427 | 3/2005 |
| JP | A-2005-132257 | 5/2005 |
| JP | A-2005-204361 | 7/2005 |
| JP | A-2007-68362 | 3/2007 |
| JP | A-2007-196967 | 8/2007 |
| JP | A-2007-209168 | 8/2007 |
| JP | A-2007-245999 | 9/2007 |
| JP | A-2007-269249 | 10/2007 |
| KR | A-2003-0088791 | 11/2003 |
| RU | 2 055 758 C1 | 3/1996 |
| WO | WO 2007/108454 A1 | 9/2007 |

OTHER PUBLICATIONS

Apr. 4, 2011 Office Action issued in Russian Patent Application No. 2010111102/11(015608).
RSS Feed: "Detroit Auto Show: General Motor's E-Flex Platform", blog, Jan. 7, 2007, XP002638678, retrieved from the internet: URL:http://green.autoblog.com/2007/01/07/Detroit-auto-show-general-motors-e-flex-platform/; retrieved on May 23, 2011.
Wiko: "Renault-Kangoo-Plug-in-hybrid2", Wikipedia, Mar. 2007 (Mar. 2007), XP002638679, retrieved from the internet: URL:http://en.wikipedia.org/wiki/File:Renault-Kangoo-Plug-in-hybrid2.jpg; retrieved on May 23, 2011.
Ifp: "Solutions for vehicle electrification", ifp Energie Nouvelles, Feb. 2007, XP002638680, retrieved from the internet: URL:www.ifpenergiesnouvelles.com; retrieved on May 24, 2011.
Jun. 15, 2011 Search Report issued in European Patent Application No. 08792759.6.
Jul. 12, 2011 Office Action issued in Japanese Patent Application No. 2009-530136.
Apr. 25, 2012 Office Action issued in Korean Patent Application No. 10-2010-7006372 w/translation.
Office Action dated May 1, 2013 issued in U.S. Appl. No. 13/137,304.
Jun. 19, 2012 Office Action issued in Japanese Patent Application No. 2009-530136 w/translation.
Jun. 21, 2012 Office Action issued in Chinese Patent Application No. 2008-80103913.9 w/translation.
Apr. 16, 2012 Office Action issued in U.S. Appl. No. 13/137,304.
Jost, Kevin, "Los Angeles: 'Green' reigns supreme," Global Vehicles, Feb. 20, 2007, pp. 8-20, aei.online.org, http://www.sae.org/automag/globalvehicles/02-2007/1-115-2-8.pdf, retrieved on Jun. 25, 2012.
Oct. 17, 2012 Office Action issued in U.S. Appl. No. 13/137,304.
Aug. 29, 2013 Office Action issued in U.S. Appl. No. 13/137,304.
Aug. 30, 2013 Office Action issued in U.S. Appl. No. 12/449,577.
Aug. 30, 2012 Office Action issued in U.S. Appl. No. 12/449,577.
Feb. 5, 2014 Office Action issued in U.S. Appl. No. 13/137,304.
Feb. 5, 2014 Office Action issued in U.S. Appl. No. 12/449,577.

* cited by examiner

VEHICLE WITH AN ENERGY SOURCE SUPPLY PORTION

This is a Continuation of application Ser. No. 12/449,577 filed Aug. 14, 2009, which in turn is a National Phase of PCT/JP2008/065233 filed Aug. 20, 2008. The disclosures of the prior applications are hereby incorporated by reference herein in their entirety.

TECHNICAL FIELD

The present invention relates to a vehicle, and particularly to a vehicle including a plurality of drive sources for drive with energy sources different in type.

BACKGROUND ART

Various environmentally friendly electric cars and hybrid vehicles have conventionally been proposed. For example, Japanese Patent Laying-Open No. 11-318004 or the like describes an electric car.

An electric car described in this Japanese Patent Laying-Open No. 11-318004 includes a charging lid automatic operation device for automatically opening and closing a charging lid closing a paddle insertion portion of a charging port by using an actuator.

A hybrid vehicle described in Japanese Patent Laying-Open No. 8-154307 includes an internal combustion engine for power generation and an internal combustion engine for running, so that a driver can be guided to run the vehicle without relying on the internal combustion engine.

In addition, a hybrid vehicle described in Japanese Patent Laying-Open No. 2005-204361 employs two motor-generators to be able to generate an alternating-current voltage.

Here, in a conventional hybrid vehicle, positional relation between a device within an engine compartment and an energy source supply portion from which energy source such as electric power is supplied has not been considered.

DISCLOSURE OF THE INVENTION

The present invention was made in view of the above-described problems, and an object of the present invention is to provide a vehicle for which positional relation between a device in an engine compartment and an energy source supply portion is considered.

A vehicle according to the present invention includes an internal combustion engine driven by fuel, a drive source driven by an energy source different from the fuel, and an energy source storage portion capable of storing the energy source. The vehicle further includes an energy source supply portion to which an external connection portion is removably connected, capable of being supplied with the energy source from the external connection portion and/or supplying the energy source to the external connection portion, and an internal combustion engine accommodation portion for accommodating the internal combustion engine. The internal combustion engine above is arranged closer to the other side surface relative to one side surface in the internal combustion engine accommodation portion, and the energy source supply portion is provided in the one side surface.

Preferably, the vehicle further includes a transmission accommodation case for accommodating a transmission transmitting, with speed change, rotational force generated by the internal combustion engine above to a drive shaft of the vehicle. Preferably, the transmission accommodation case above is provided between the one side surface and the internal combustion engine.

Preferably, the energy source above is electric power, the energy source storage portion is a battery capable of storing and discharging electric power, and the transmission accommodation case accommodates the rotating electric machine driven by electric power from the battery and driving wheels.

Preferably, the wheels of the vehicle above are driven by motive power from the rotating electric machine or the internal combustion engine. Preferably, the energy source is electric power, the energy source storage portion is a battery capable of storing and discharging electric power, and the drive source is a first rotating electric machine. The vehicle further comprises a second rotating electric machine. The wheels are driven only by the first rotating electric machine and the second rotating electric machine is capable of generating electric power by using motive power of the internal combustion engine and charging the battery or driving the first rotating electric machine by using the generated electric power.

Preferably, the internal combustion engine above is 3-cylinder engine. Preferably, the vehicle further includes an inverter case for accommodating an inverter for controlling drive of the rotating electric machine above, and the inverter case is provided between the one side surface and the internal combustion engine. Preferably, the inverter case above is arranged in a region located between the internal combustion engine and the energy source supply portion.

Preferably, the energy source above is electric power, the drive source is a rotating electric machine having a polyphase winding and a neutral point of the polyphase winding, and the energy source storage portion is a battery. The vehicle further includes an inverter connected to the rotating electric machine above and an inverter control portion capable of controlling drive of the inverter, and the energy source supply portion includes a line connected to the neutral point. The inverter control portion above controls the inverter such that AC electric power provided to the neutral point is converted to DC electric power for supply to the battery.

Preferably, the rotating electric machine above includes a first rotating electric machine having a first polyphase winding and a first neutral point of the first polyphase winding and a second rotating electric machine having a second polyphase winding and a second neutral point of the second polyphase winding. The energy source supply portion above includes a first line connected to the first neutral point and a second line connected to the second neutral point. The inverter above includes a first inverter for converting DC electric power from the battery to AC electric power and supplying the AC electric power to the first rotating electric machine and a second inverter for converting DC electric power from the battery to AC electric power and supplying the AC electric power to the second rotating electric machine. The inverter control portion above controls the first and second inverters such that AC electric power provided to the first and second neutral points can be converted to DC electric power for supply to the battery.

Preferably, the energy source above is electric power, the drive source is a rotating electric machine having a polyphase winding and a neutral point of the polyphase winding, and the energy source storage portion is a battery. The vehicle further includes an inverter connected to the rotating electric machine above and an inverter control portion capable of controlling drive of the inverter. The energy source supply portion above includes a line connected to the neutral point, and the inverter control portion controls the inverter such that DC electric power supplied from the battery to the inverter can be converted to AC electric power for supply from the energy source supply portion to an external load.

Preferably, the rotating electric machine above includes a first rotating electric machine having a first polyphase winding and a first neutral point of the first polyphase winding and a second rotating electric machine having a second polyphase winding and a second neutral point of the second polyphase winding, and the energy source supply portion includes a first line connected to the first neutral point and a second line connected to the second neutral point. The inverter above includes a first inverter for converting DC electric power from the battery to AC electric power and supplying the AC electric power to the first rotating electric machine and a second inverter for converting DC electric power from the battery to AC electric power and supplying the AC electric power to the first rotating electric machine. In addition, the inverter control portion above controls the first inverter and the second inverter such that DC electric power supplied from the battery to the first inverter and the second inverter can be converted to AC electric power for supply from the energy source supply portion to an external load.

Preferably, the energy source is electric power, the energy source storage portion is a battery, and the vehicle further includes a conversion device connected to the energy source supply portion and the battery. The conversion device above is capable of conversion of electric power supplied from the energy source supply portion to DC electric power for charging the battery and/or conversion of DC electric power supplied from the battery for supply from the energy source supply portion to an external load.

Preferably, the conversion device above is provided at a position distant from the internal combustion engine accommodation portion, and the vehicle further includes a line connecting the conversion device and the energy source supply portion to each other and passing through the internal combustion engine accommodation portion.

Preferably, the vehicle further includes a driver and/or passenger accommodation portion capable of accommodating a driver and/or a passenger and a luggage storage portion located on a side opposite to the internal combustion engine accommodation portion, with respect to the driver and/or passenger accommodation portion, and the conversion device is arranged within the luggage storage portion.

In another aspect, a hybrid vehicle according to the present invention is a hybrid vehicle incorporating an internal combustion engine and a motor, and the hybrid vehicle includes: a battery for supplying electric power for driving the motor to the motor; an electric power reception portion electrically connected to the battery, that can be connected to a connector for supplying electric power outside the vehicle to the hybrid vehicle; and an internal combustion engine accommodation portion for accommodating the internal combustion engine. The hybrid vehicle includes one side surface and the other side surface located opposite to the one side surface, the internal combustion engine is arranged to be offset toward the other side surface with respect to a centerline passing through a center in a direction of width of the hybrid vehicle, and the electric power reception portion is provided in the one side surface.

In another aspect, a hybrid vehicle according to the present invention is a hybrid vehicle incorporating an internal combustion engine and a motor, and the hybrid vehicle includes: a battery for supplying electric power for driving the motor to the motor; an electric power reception portion electrically connected to the battery, that can be connected to a connector for supplying electric power outside the vehicle to the hybrid vehicle; and an internal combustion engine accommodation portion for accommodating the internal combustion engine. The hybrid vehicle includes one side surface and the other side surface located opposite to the one side surface, the internal combustion engine is arranged closer to the other side surface relative to the one side surface, with respect to a centerline passing through a center in a direction of width of the hybrid vehicle, and the electric power reception portion is provided in the one side surface.

Preferably, the hybrid vehicle further includes an inverter case for accommodating an inverter for controlling drive of the motor above, and the inverter case is arranged between the internal combustion engine and the one side surface, in the internal combustion engine accommodation portion.

Preferably, the hybrid vehicle further includes an inverter case for accommodating an inverter for controlling drive of the motor, and the inverter case is arranged between the internal combustion engine and the electric power reception portion, in the internal combustion engine accommodation portion.

According to the present invention, a vehicle for which positional relation between a device in an engine compartment and an energy source supply portion is considered.

BEST MODES FOR CARRYING OUT THE INVENTION

A hybrid vehicle according to the present embodiment will be described with reference to FIGS. 1 to 15. When the number, an amount or the like is mentioned in the embodiment described below, the scope of the present invention is not necessarily limited to such a number, an amount or the like, unless otherwise specified. In addition, in the embodiment below, each component is not necessarily essential in the present invention, unless otherwise specified. Moreover, when a plurality of embodiments are shown below, combination as appropriate of features in the embodiments is originally encompassed, unless otherwise specified.

(First Embodiment)

Figure 1:
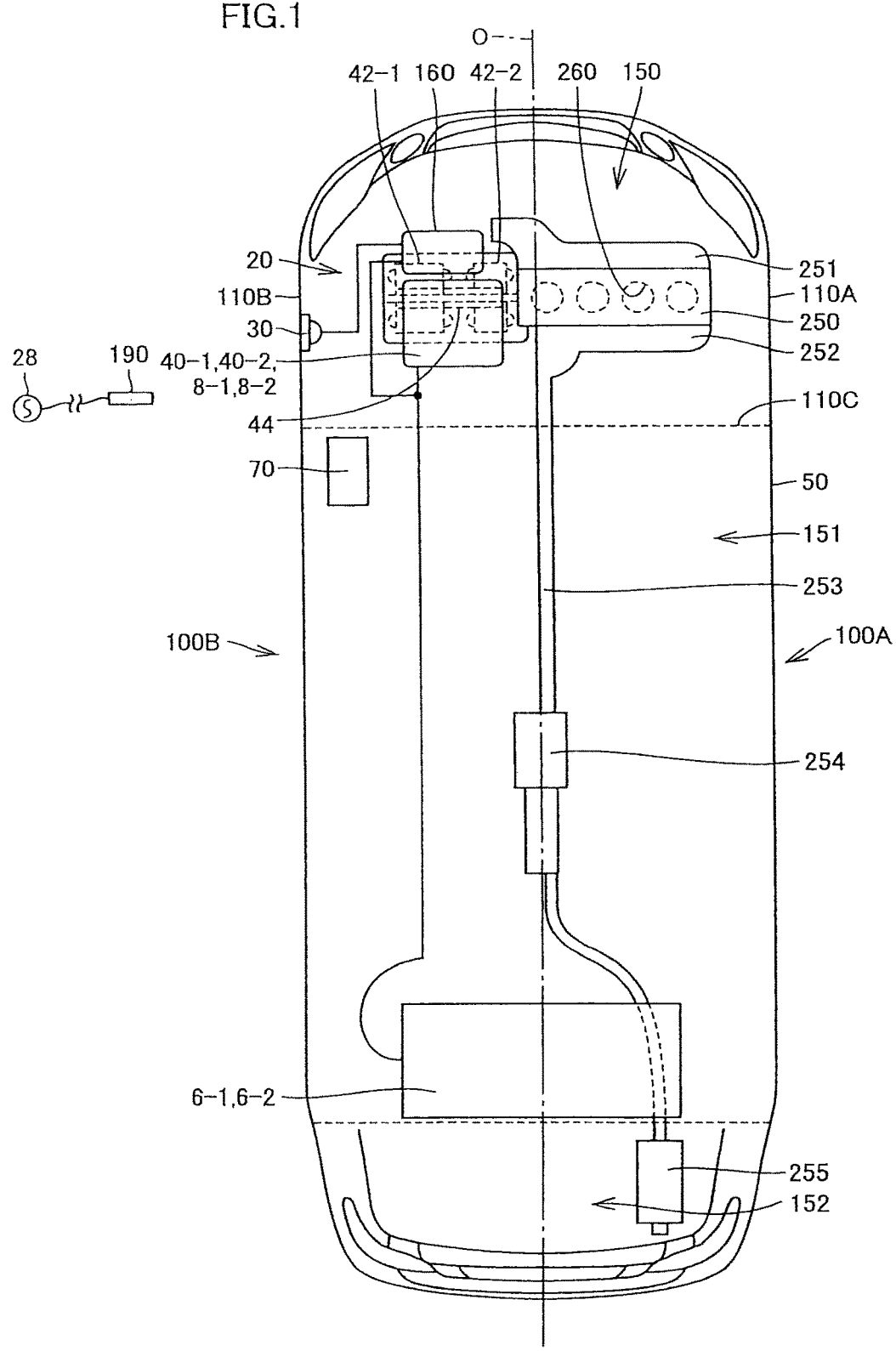
FIG. 1 is a plan view showing an overall structure of a hybrid vehicle according to a first embodiment of the present invention, in such a manner that the inside thereof can be seen.
Figure 2:
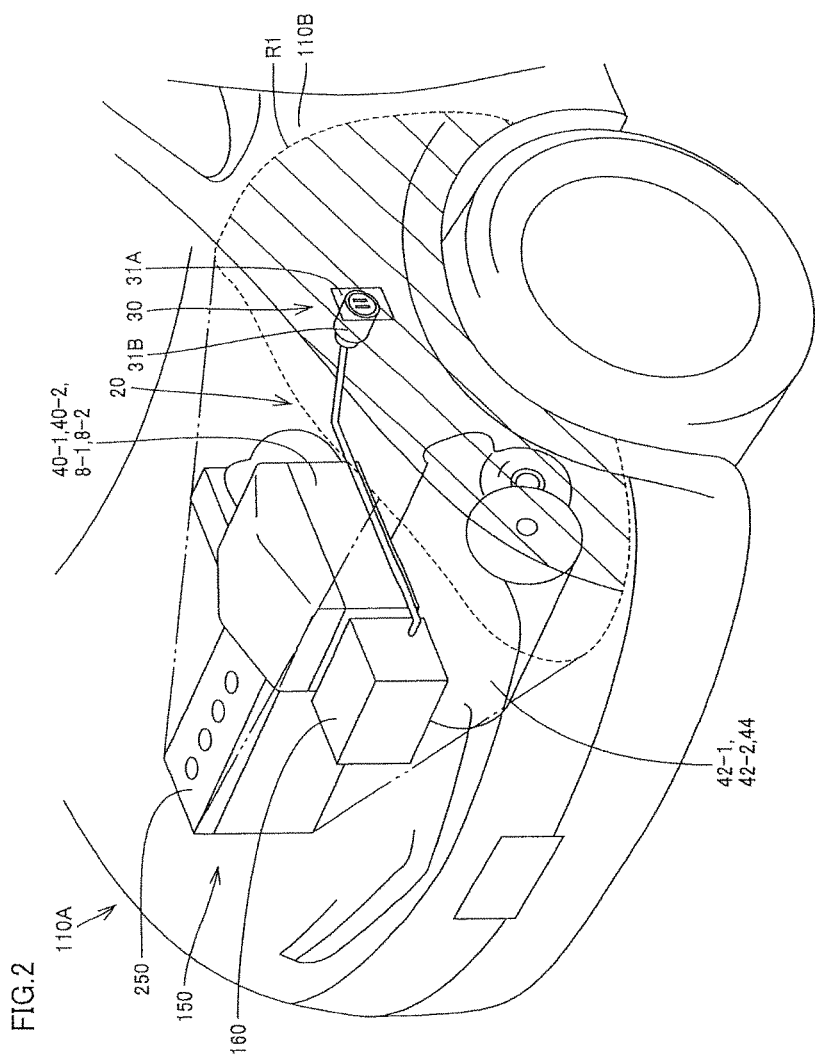
FIG. 2 is a schematic diagram showing arrangement of each device within an engine compartment, in such a manner that the inside thereof can be seen.

A hybrid vehicle according to the present first embodiment will be described with reference to FIGS. 1 to 3. FIG. 1 shows an overall structure of the hybrid vehicle according to the present embodiment, in such a manner that the inside thereof can be seen, and FIG. 2 shows arrangement of each device within an engine compartment (internal combustion engine accommodation portion) 150 in such a manner that the inside thereof can be seen. As shown in FIG. 1, the hybrid vehicle includes a vehicle main body 50 including a body and a plurality of exterior members attached to the exterior of this body.

Vehicle main body 50 includes side surfaces 100A, 100B aligned in a direction of width of the vehicle. Vehicle main body 50 includes a driver and/or passenger accommodation chamber 151 capable of accommodating a driver and/or a passenger, a luggage room 152 defined in the rear of driver and/or passenger accommodation chamber 151 in terms of a direction of travel, capable of storing luggage or the like, and an engine compartment 150 defined in front of driver and/or passenger accommodation chamber 151 in terms of the direction of travel of the hybrid vehicle. A separator 110C is provided between driver and/or passenger accommodation chamber 151 and engine compartment 150 for partition.

In other words, engine compartment 150 is defined by separator 110C, engine compartment sidewall portions 110A, 110B of respective side surfaces 100A, 100B, that are located in the front of separator 110C, and a front portion.

Engine compartment 150 accommodates an engine 250, motor-generators 42-1, 42-2, inverters 40-1, 40-2, converters 8-1, 8-2, and a charging device 20.

Engine 250 is arranged to be offset toward one side surface 100A with respect to a centerline O passing through the center in the direction of width of the hybrid vehicle. Thus, the center of engine 250 in the direction of width (the direction of width of the hybrid vehicle) is closer to side surface 100A relative to side surface 100B.

Engine 250 includes four combustion chambers 260, into which liquid fuel such as gasoline is supplied so that motive power can be generated by burning the fuel. An intake manifold 251 for supplying outside air into combustion chamber 260 and an exhaust manifold 252 for exhausting exhaust gas resulting from combustion of fuel in combustion chamber 260 are connected to engine 250. It is noted that engine 250 of the hybrid vehicle according to the present first embodiment is an in-line four-cylinder engine.

An exhaust pipe 253 extending along centerline O is connected to exhaust manifold 252, and exhaust pipe 253 is connected to a muffler 255 through a sub muffler 254.

An accommodation case for accommodating inverters 40-1, 40-2 and an accommodation case for accommodating converters 8-1, 8-2 are stacked in a direction of height of the hybrid vehicle.

Inverters 40-1, 40-2 and converters 8-1, 8-2 are arranged such that they are adjacent to engine 250 on the side of side surface 100B and offset toward side surface 100B with respect to centerline O. Namely, the accommodation cases for accommodating inverters 40-1, 40-2 and converters 8-1, 8-2 are arranged such that the center thereof in the direction of width is closer to engine compartment sidewall portion 110B relative to engine compartment sidewall portion 110A.

Thus, the side surfaces of the respective accommodation cases for accommodating inverters 40-1, 40-2 and converters 8-1, 8-2 on the side of engine compartment sidewall portion 110A are arranged to be opposed to the side surface of engine 250 on the side of engine compartment sidewall portion 110B and the side surface of exhaust manifold 252 on the side of engine compartment sidewall portion 110B.

Charging device 20 includes a conversion device 160 disposed on the front side of the hybrid vehicle with respect to the accommodation cases for accommodating inverters 40-1, 40-2 and converters 8-1, 8-2 and a charge plug 30 provided in engine compartment sidewall portion 110B.

An accommodation case for accommodating conversion device 160 is provided at a position adjacent to engine 250 on the side of engine compartment sidewall portion 110B.

Charge plug 30 is electrically connected to conversion device 160 through a line, and a connector 190 connected to a power supply 28 such as a household power supply can removably be connected to charge plug 30.

It is noted that connector 190 includes both of a connector for charging, a connector for power feed, and a connector for charging and power feed.

A connector for supplying electric power supplied from a commercial power supply (for example, single-phase AC 100V in Japan) to the hybrid vehicle is used as the connector for charging. An example of such a connector for charging includes a socket connected to a general household power supply.

The connector for power feed is a connector for supplying electric power from the hybrid vehicle (for example, single-phase AC 100V in Japan) to an external load. In addition, the connector for charging and power feed is a connector having both functions of the connector for charging and the connector for power feed above, and it is capable of supplying electric power supplied from the commercial power supply to the hybrid vehicle and supplying electric power from the hybrid vehicle to the external load.

Regarding a method of supplying and receiving electric power between connector 190 and charge plug 30, the method may be such a contact type (contacting) that a part of connector 190 and at least a part of charge plug 30 are in direct contact with each other, or may be a non-contact type (inductive).

Charge plug 30 is provided in a portion of engine compartment sidewall portion 110B located in the direction of width of the hybrid vehicle, with respect to the accommodation case for accommodating conversion device 160 and the accommodation cases for accommodating inverters 40-1, 40-2 and converters 8-1, 8-2.

Engine 250 and charge plug 30 are arranged as described above, so that a distance between engine 250 and charge plug 30 is great. Accordingly, even though a temperature of air around engine 250 or exhaust manifold 252 becomes high due to heat generated therefrom, heating even of charge plug 30 can be suppressed and deterioration of charge plug 30 due to heat can be suppressed.

In addition, engine 250 is arranged to be offset toward one engine compartment sidewall portion 110A, so that a gap between the accommodation case for accommodating conversion device 160 or the accommodation cases for accommodating inverters 40-1, 40-2 and converters 8-1, 8-2 and charge plug 30 can readily be secured. Contact between charge plug 30 and each case can be suppressed and damage of charge plug 30 can be suppressed.

Moreover, by arranging the accommodation case for accommodating conversion device 160 and the accommodation cases for accommodating inverters 40-1, 40-2 and converters 8-1, 8-2 so as to cover the side surfaces of respective engine 250 and exhaust manifold 252 on the side of engine compartment sidewall portion 110B, transfer of heat from engine 250 or the like to charge plug 30 can be suppressed.

In FIG. 2, charge plug 30 is formed in a portion of engine compartment sidewall portion 110B, where a region R1 adjacent to the accommodation case for accommodating conversion device 160 and the accommodation cases for accommodating inverters 40-1, 40-2 and converters 8-1, 8-2 is located.

Here, region R1 refers to a region where the accommodation case for accommodating conversion device 160 and the accommodation cases for accommodating inverters 40-1, 40-2 and converters 8-1, 8-2 are projected assuming that the accommodation case for accommodating conversion device 160 and the accommodation cases for accommodating inverters 40-1, 40-2 and converters 8-1, 8-2 arranged adjacent to engine 250 are projected on engine compartment sidewall portion 110B with engine 250 serving as a heat source (light source) emitting radial heat wave (light).

Thus, by arranging charge plug 30 in the portion where region R1 of engine compartment sidewall portion 110B is located, direct radiation of heat from engine 250 to charge plug 30 can be suppressed and deterioration of charge plug 30 can be suppressed.

In other words, the accommodation case for accommodating conversion device 160 and the accommodation cases for accommodating inverters 40-1, 40-2 and converters 8-1, 8-2 are located between charge plug 30 and engine 250, so that a space defined by charge plug 30 and engine 250 is separated by the accommodation case for accommodating conversion device 160 and the accommodation cases for accommodating inverters 40-1, 40-2 and converters 8-1, 8-2.

The reason why the accommodation cases for accommodating inverters 40-1, 40-2 and converters 8-1, 8-2 are arranged on the side of engine 250 and exhaust manifold 252 is that a cooling path for cooling inverters 40-1, 40-2 and converters 8-1, 8-2 is disposed in the accommodation cases for accommodating inverters 40-1, 40-2 and converters 8-1, 8-2 and heat capacity is great.

In addition, a line connecting charge plug 30 and conversion device 160 to each other is also disposed such that the accommodation cases for accommodating inverters 40-1, 40-2 and converters 8-1, 8-2 and the accommodation case for accommodating conversion device 160 hide the line from engine 250. Thus, deterioration of the line due to heat from engine 250 can also be suppressed.

An accommodation case for accommodating motor-generators 42-1, 42-2 and a powertrain (transmission) 44 is arranged below the accommodation case for accommodating conversion device 160 and the accommodation cases for accommodating inverters 40-1, 40-2 and converters 8-1, 8-2 above.

Here, a transaxle including motor-generators 42-1, 42-2 and powertrain 44 is accommodated in the accommodation case, and this transaxle is arranged on the side of engine 250. More specifically, the transaxle is arranged in a region located between the engine and charge plug 30 and transfer of heat from engine 250 to charge plug 30 is suppressed.

In addition, charge plug 30 may be arranged in a projection region, assuming that the accommodation case for accommodating motor-generators 42-1, 42-2 and powertrain 44 is projected on engine compartment sidewall portion 110B with engine 250 serving as the heat source emitting radial heat wave. Thus, radiant heat from engine 250 can be prevented from reaching charge plug 30.

It is noted that a planetary gear is adopted as powertrain 44 and motive power from motor-generator 42-1 and motive power from engine 250 can selectively be transmitted to an axle.

In the present first embodiment, transfer of heat from engine 250 or the like to charge plug 30 is suppressed by the accommodation case for accommodating conversion device 160 and the accommodation cases for accommodating inverters 40-1, 40-2 and converters 8-1, 8-2, however, the embodiment is not limited thereto and other vehicle-mounted devices may be arranged.

Charge plug 30 includes a connector main body 31B to which connector 190 shown in FIG. 1 can be connected, an accommodation chamber for accommodating connector main body 31B, provided on an inner side of engine compartment sidewall portion 110B in engine compartment 150, and a lid member 31A for opening and closing an opening of the accommodation chamber.

It is noted that lid member 31A is provided in a portion of engine compartment sidewall portion 110B where region R1 is located.

Figure 3:
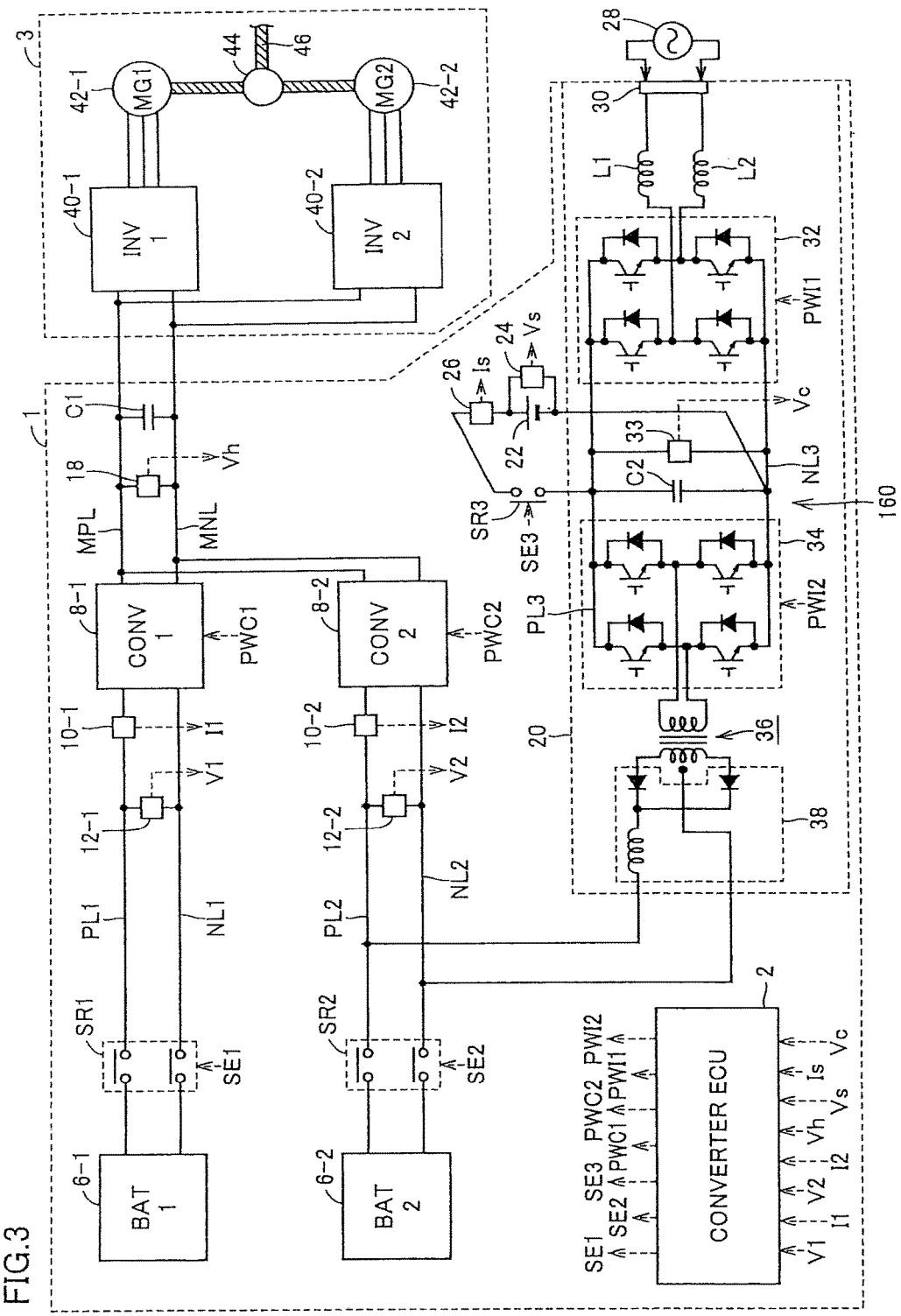
FIG. 3 is an overall block diagram of the vehicle according to the first embodiment of the present invention.

FIG. 3 is an overall block diagram of the vehicle according to the first embodiment of the present invention. Referring to FIG. 3, the hybrid vehicle includes a power supply system 1 and a drive power generation portion 3. Drive power generation portion 3 includes inverters 40-1, 40-2, motor-generators 42-1, 42-2, powertrain 44, and a drive shaft 46. Inverters 40-1, 40-2 are connected in parallel to a main positive bus MPL and a main negative bus MNL. Receiving DC electric power supplied from power supply system 1, inverters 40-1, 40-2 drive motor-generators 42-1, 42-2, respectively. In addition, inverters 40-1, 40-2 convert AC electric power generated by motor-generators 42-1, 42-2 respectively to DC electric power and output the DC electric power to power supply system 1.

Each inverter 40-1, 40-2 is implemented, for example, by a bridge circuit including switching elements of three phases. Inverter 40-1, 40-2 drives a corresponding motor-generator, by performing a switching operation in response to a drive signal from an HV_ECU (Hybrid Vehicle Electronic Control Unit) 70 shown in FIG. 1.

Receiving AC electric power supplied from inverters 40-1, 40-2, motor-generators 42-1, 42-2 generate rotational drive power, respectively. In addition, receiving external rotational force, motor-generators 42-1, 42-2 generate electric power. Motor-generator 42-1, 42-2 is implemented, for example, by a three-phase AC rotating electric machine including a rotor having a permanent magnet embedded. Moreover, motor-generators 42-1, 42-2 are coupled to powertrain 44 and coupled to wheels (not shown) through drive shaft 46 further coupled to powertrain 44.

Motor-generators 42-1, 42-2 are also coupled to engine 250 through powertrain 44 or drive shaft 46. Then, HV_ECU 70 carries out control such that an optimal ratio between drive power generated by engine 250 and drive power generated by motor-generators 42-1, 42-2 is attained. Any one of motor-generators 42-1, 42-2 is caused to function solely as a motor, and the other motor-generator is caused to function solely as a generator. Thus, in the hybrid vehicle according to the present first embodiment, a hybrid system including an in-line four-cylinder engine, two motor-generators, and powertrain 44 implemented by the planetary gear is adopted as described above.

The hybrid system is not limited as such, and what is called a parallel hybrid system including, for example, an in-line four-cylinder engine, one motor, and a continuously variable transmission (CVT) is also applicable.

In addition, a parallel hybrid system including an in-line four-cylinder engine, one motor, and an automatic transmission (AT) is also applicable.

Moreover, a series hybrid system including an in-line three-cylinder engine in which combustion chambers are arranged in a line in a direction of width of the hybrid vehicle, one motor, and one generator is also applicable. It is noted that any of the parallel hybrid system and the series hybrid system above may be capable of charging and charging of outside element by using a charging and outside-element-charging method using a neutral point of each motor or a generator or by separately arranging a conversion device.

Power supply system 1 includes power storage devices 6-1, 6-2, system relays SR1, SR2, converters 8-1, 8-2, a smoothing capacitor C1, current sensors 10-1, 10-2, voltage sensors 12-1, 12-2, and 18, and a converter ECU 2. In addition, power supply system 1 further includes charging device 20, a solar battery 22, a voltage sensor 24, a current sensor 26, and a system relay SR3.

Power storage devices 6-1, 6-2 are DC power supplies that can be charged and can discharge, and they are implemented, for example, by a secondary battery such as a nickel-metal hydride battery or a lithium-ion battery. Power storage device 6-1 is connected to one end of system relay SR1 and power storage device 6-2 is connected to one end of system relay SR2. It is noted that at least one of power storage devices 6-1, 6-2 may be implemented by an electric double layer capacitor.

System relay SR1 is disposed between power storage device 6-1 and a positive electrode line PL1, a negative electrode line NL1, and turned on and off in response to a signal SE1 from converter ECU 2. System relay SR2 is disposed between power storage device 6-2 and a positive electrode line PL2, a negative electrode line NL2, and turned on and off in response to a signal SE2 from converter ECU 2.

Converter 8-1 is provided between positive electrode line PL1, negative electrode line NL1 and main positive bus MPL, main negative bus MNL, and converts a voltage between positive electrode line PL1, negative electrode line NL1 and main positive bus MPL, main negative bus MNL based on a drive signal PWC1 from converter ECU 2. Converter 8-2 is provided between positive electrode line PL2, negative electrode line NL2 and main positive bus MPL, main negative bus MNL, and converts a voltage between positive electrode line PL2, negative electrode line NL2 and main positive bus MPL, main negative bus MNL based on a drive signal PWC2 from converter ECU 2.

Current sensor 10-1 detects a current I1 that flows through positive electrode line PL1 and outputs the detected current value to converter ECU 2. Voltage sensor 12-1 detects a voltage V1 across positive electrode line PL1 and negative electrode line NL1 and outputs the detected voltage value to converter ECU 2. Current sensor 10-2 detects a current I2 that flows through positive electrode line PL2 and outputs the detected current value to converter ECU 2. Voltage sensor 12-2 detects a voltage V2 across positive electrode line PL2 and negative electrode line NL2 and outputs the detected voltage value to converter ECU 2.

Smoothing capacitor C1 is connected between main positive bus MPL and main negative bus MNL and reduces an electric power fluctuation component included in main positive bus MPL and main negative bus MNL. Voltage sensor 18 detects a voltage Vh across main positive bus MPL and main negative bus MNL and outputs the detected voltage value to converter ECU 2.

Charging device 20 includes charge plug 30 and conversion device 160, and conversion device 160 includes coils L1, L2, an AC/DC conversion portion 32, a smoothing capacitor C2, a DC/AC conversion portion 34, an isolation transformer 36, a rectifier portion 38, and a voltage sensor 33.

Charge plug 30 serves as an electric power interface for receiving electric power supplied from power supply 28 outside the vehicle (such as a system power supply), and it receives AC electric power from power supply 28 and discharges. Coils L1, L2 function as a noise filter and also function as a reactor of a boost chopper circuit for boosting electric power from power supply 28 together with AC/DC conversion portion 32 to output the boosted electric power to a positive electrode line PL3 and a negative electrode line NL3.

AC/DC conversion portion 32 is implemented by a single-phase bridge circuit. AC/DC conversion portion 32 converts AC electric power provided from power supply 28 to charge plug 30 to DC electric power and outputs the DC electric power to positive electrode line PL3 and negative electrode line NL3, based on a drive signal PWI1 from converter ECU 2.

Smoothing capacitor C2 is connected between positive electrode line PL3 and negative electrode line NL3 and reduces an electric power fluctuation component included between positive electrode line PL3 and negative electrode line NL3. Voltage sensor 33 detects a voltage Vc across positive electrode line PL3 and negative electrode line NL3 (corresponding to a voltage across terminals of smoothing capacitor C2) and outputs the detected voltage value to converter ECU 2.

DC/AC conversion portion 34 is implemented by a single-phase bridge circuit. DC/AC conversion portion 34 converts DC electric power supplied from positive electrode line PL3 and negative electrode line NL3 to high-frequency AC electric power and outputs the AC electric power to isolation transformer 36, based on a drive signal PWI2 from converter ECU 2.

Isolation transformer 36 includes a core formed from a magnetic material and a primary coil and a secondary coil wound around the core. The primary coil and the secondary coil are electrically isolated from each other and connected to DC/AC conversion portion 34 and rectifier portion 38, respectively. Isolation transformer 36 converts high-frequency AC electric power received from DC/AC conversion portion 34 to a voltage level in accordance with a turns ratio of the primary coil and the secondary coil, and outputs the electric power to rectifier portion 38. Rectifier portion 38 rectifies the AC electric power output from isolation transformer 36 to DC electric power and outputs the DC electric power to positive electrode line PL2 and negative electrode line NL2.

Solar battery 22 is connected in parallel to smoothing capacitor C2 with system relay SR3 being interposed. More specifically, solar battery 22 has a positive electrode connected to the other end of system relay SR3 having one end connected to positive electrode line PL3, and has a negative electrode connected to negative electrode line NL3. Solar battery 22 converts solar energy to electric energy to generate a DC voltage.

System relay SR3 is disposed between positive electrode line PL3 and the positive electrode of solar battery 22. System relay SR3 is turned on and off in response to a signal SE3 from converter ECU 2. Voltage sensor 24 detects a voltage Vs output from solar battery 22 and outputs the detected voltage value to converter ECU 2. Current sensor 26 detects a current Is output from solar battery 22 and outputs the detected current value to converter ECU 2.

Converter ECU 2 generates drive signals PWC1, PWC2 based on each detection value detected by each sensor described above, and outputs generated drive signals PWC1, PWC2 to converters 8-1, 8-2, respectively.

Here, when power storage device 6-2 is charged by power supply 28 outside the vehicle, converter ECU 2 generates signal SE3 for turning off system relay SR3 and outputs the signal to system relay SR3, and generates signal SE2 for turning on system relay SR2 and outputs the signal to system relay SR2. Then, converter ECU 2 generates drive signals PWI1, PWI2 for driving charging device 20 and outputs the signals to charging device 20 so as to charge power storage device 6-2 sequentially from power supply 28 through charging device 20 and system relay SR2.

In addition, when power storage device 6-1 is charged by power supply 28, converter ECU 2 generates signal SE3 for turning off system relay SR3 and outputs the signal to system relay SR3, and generates signal SE1 for turning on system relay SR1 and outputs the signal to system relay SR1. Then, converter ECU 2 generates drive signals PWI1, PWI2 as well as drive signals PWC1, PWC2 for driving converters 8-1, 8-2, so as to charge power storage device 6-1 sequentially from power supply 28 through charging device 20, positive electrode line PL2 and negative electrode line NL2, converter 8-2, main positive bus MPL and main negative bus MNL, converter 8-1, and system relay SR1.

Moreover, when power storage device 6-1 is charged by solar battery 22, converter ECU 2 generates signal SE3 for turning on system relay SR3 and outputs the signal to system relay SR3, and generates signal SE1 for turning on system relay SR1 and outputs the signal to system relay SR1. Then, converter ECU 2 generates drive signal PWI2 for driving DC/AC conversion portion 34 of charging device 20 as well as drive signals PWC1, PWC2 for driving converters 8-1, 8-2, so as to charge power storage device 6-1 sequentially from solar battery 22 through charging device 20, positive electrode line PL2 and negative electrode line NL2, converter 8-2, main positive bus MPL and main negative bus MNL, converter 8-1, and system relay SR1.

Further, when power storage device 6-2 is charged by solar battery 22, converter ECU 2 generates signal SE3 for turning on system relay SR3 and outputs the signal to system relay SR3, and generates signal SE2 for turning on system relay SR2 and outputs the signal to system relay SR2. Then, converter ECU 2 generates drive signal PWI2 for driving DC/AC conversion portion 34 of charging device 20, so as to charge power storage device 6-2 sequentially from solar battery 22 through charging device 20, positive electrode line PL2 and negative electrode line NL2, and system relay SR2.

In supplying electric power to the outside from power storage device 6-1 through charge plug 30, converter ECU 2 generates signal SE3 for turning off system relay SR3 and outputs the signal to system relay SR3, and generates signal SE1 for turning on system relay SR1 and outputs the signal to system relay SR1. Then, converter ECU 2 generates drive signals PWI1, PWI2 as well as drive signals PWC1, PWC2 for driving converters 8-1, 8-2 so as to charge an external AC power supply sequentially from power storage device 6-1 through system relay SR1, converter 8-1, main positive bus MPL and main negative bus MNL, converter 8-2, positive electrode line PL2 and negative electrode line NL2, and charging device 20.

In addition, in supplying electric power to the outside from power storage device 6-2 through charge plug 30, converter ECU 2 generates signal SE3 for turning off system relay SR3 and outputs the signal to system relay SR3, and generates signal SE2 for turning on system relay SR2 and outputs the signal to system relay SR2. Then, converter ECU 2 generates drive signals PWI1, PWI2 as well as drive signals PWC1, PWC2 for turning off drive of converters 8-1, 8-2 so as to charge the external AC power supply sequentially from power storage device 6-2 through system relay SR2 and charging device 20.

In the present embodiment, charging of the power storage device mounted on the hybrid vehicle and power feed to the AC power supply outside the hybrid vehicle from the power storage device are both possible, however, only a function to charge the power storage device may be achieved.

In addition, in the present first embodiment, though charge plug 30 is formed in a portion of engine compartment sidewall portion 110B where region R1 is located, the embodiment is not limited thereto. For example, charge plug 30 may be arranged also in a portion located outside region R1, where a distance from engine 250 is greater than in an example where it is located in region R1. In such a case, by ensuring a distance from engine 250, heat from engine 250 can be prevented from reaching charge plug 30.

(Second Embodiment)

A hybrid vehicle according to a second embodiment of the present invention will be described with reference to FIGS. 4 to 6. It is noted that features in FIGS. 4 to 6 the same as or corresponding to those shown in FIGS. 1 to 3 have the same reference numerals allotted and description thereof may not be provided.

Figure 4:
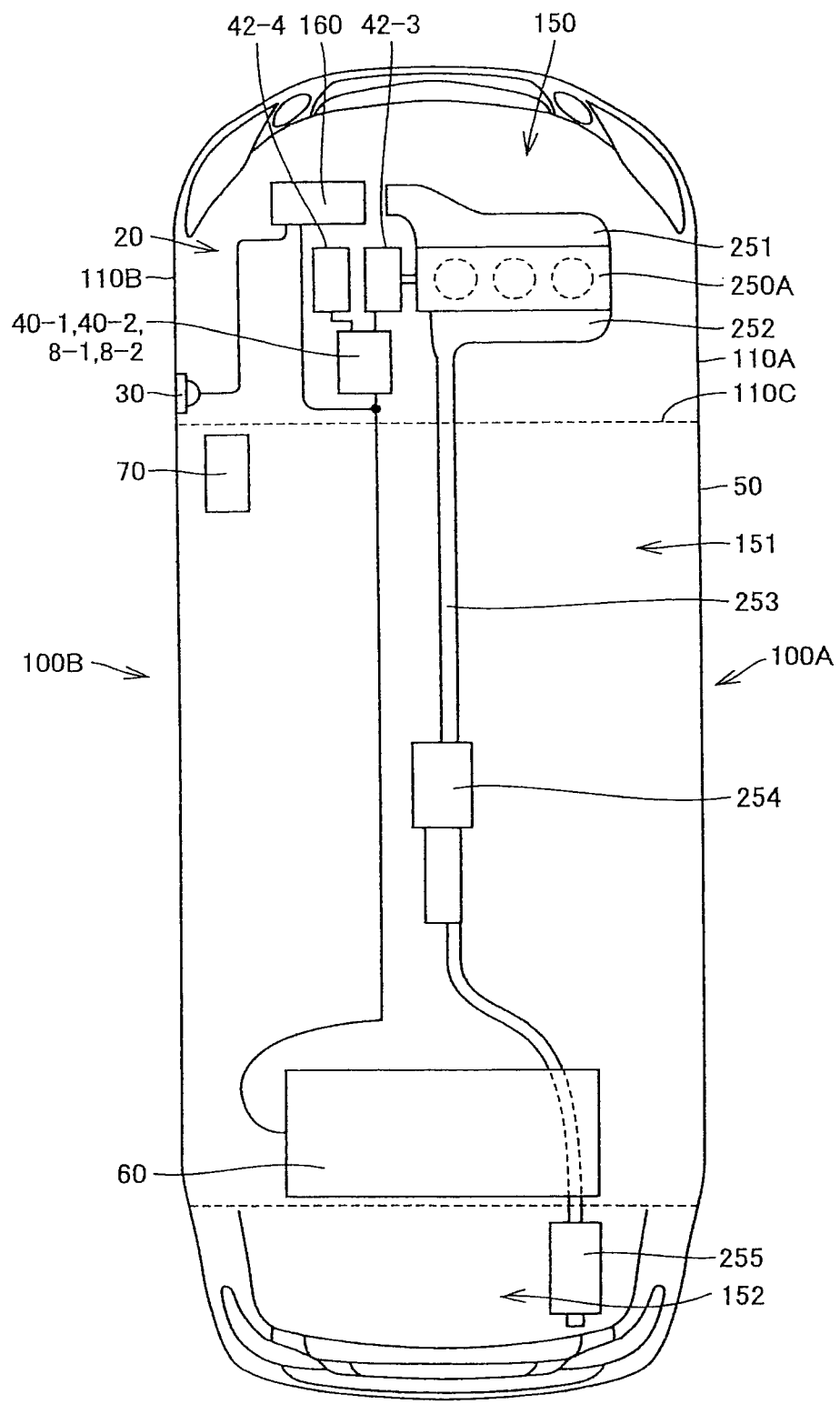
FIG. 4 is a schematic diagram showing an overall structure of a hybrid vehicle according to a second embodiment of the present invention.
Figure 5:
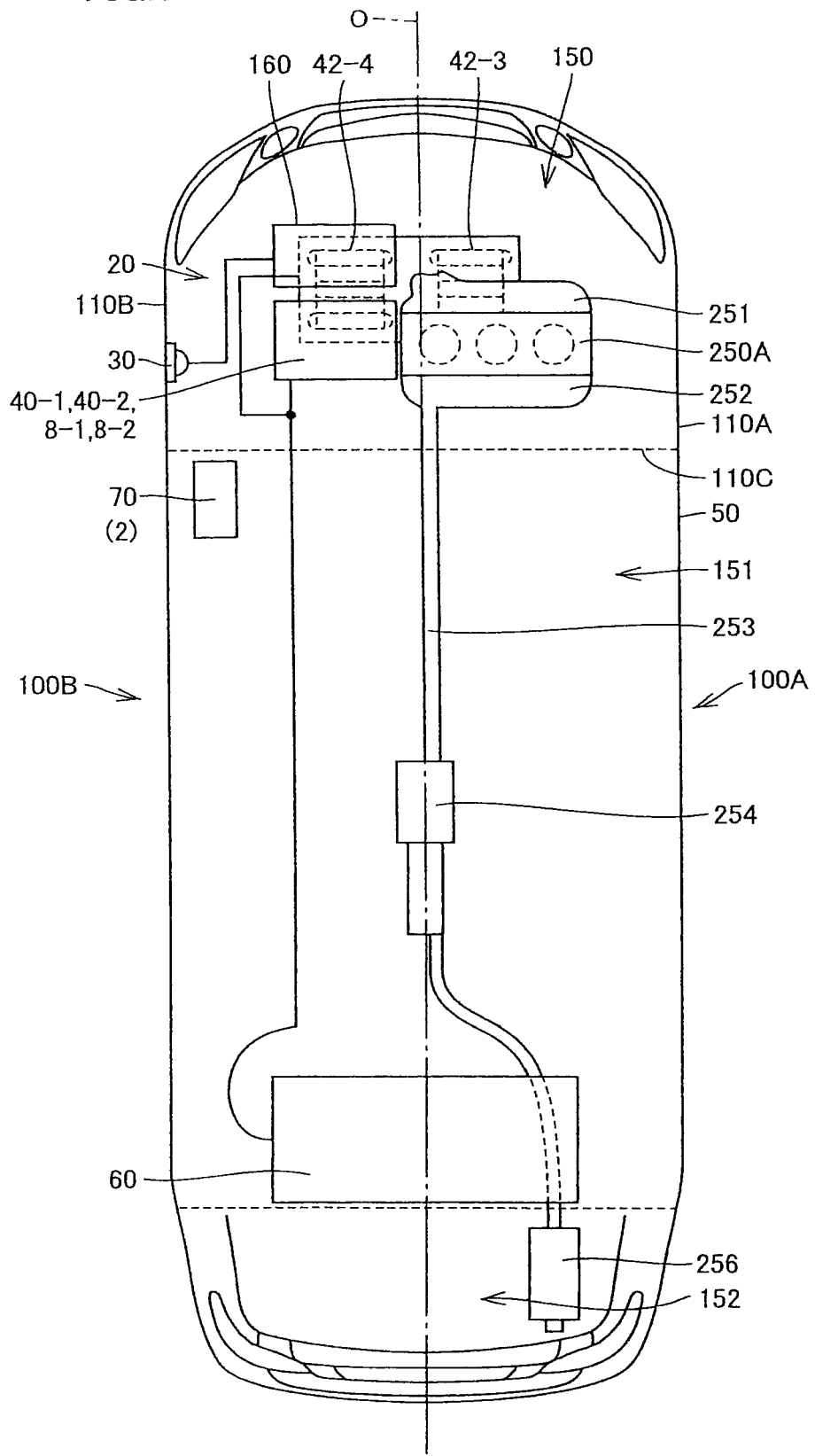
FIG. 5 is a plan view schematically showing arrangement of each vehicle-mounted device in the hybrid vehicle shown in FIG. 4.

FIG. 4 is a schematic diagram showing an overall structure of the hybrid vehicle according to the second embodiment of the present invention, and FIG. 5 is a plan view schematically showing arrangement of each vehicle-mounted device in the hybrid vehicle shown in FIG. 4. In addition, FIG. 6 is a schematic diagram schematically showing arrangement of each vehicle-mounted device shown in FIG. 5, in such a manner that the inside can be seen.

As shown in FIG. 4, in the hybrid vehicle according to the second embodiment of the present invention, what is called a series hybrid system is adopted and the hybrid vehicle includes an engine 250A, a motor-generator 42-3 driven by motive power from engine 250A and capable of functioning as a generator, a power storage device 60 that can be charged and can discharge, a motor-generator 42-4 for generating motive power for driving wheels, inverters 40-1, 40-2, and converters 8-1, 8-2.

Engine 250A is a three-cylinder engine in which three combustion chambers are arranged in a line in a direction of width of the hybrid vehicle and it can be driven by liquid fuel such as gasoline. Motor-generator 42-3 is driven by the motive power from engine 250A, so that motor-generator 42-3 generates electric power for driving motor-generator 42-4 or charging power storage device 60.

In addition, motor-generator 42-4 is supplied with electric power from motor-generator 42-3 and power storage device 60 through inverters 40-1, 40-2 or the like so that the wheels are driven.

Thus, engine 250A functions as a drive source for driving motor-generator 42-3 functioning as the generator, and engine 250A does not directly drive the wheels. Accordingly, as engine 250A can drive motor-generator 42-3 with a good drive efficiency, a compact engine such as an in-line three-cylinder engine can be adopted. An engine of lower power than engine 250 in the hybrid vehicle according to the first embodiment above can be adopted as engine 250A in the hybrid vehicle according to the second embodiment of the present invention, and hence the engine can be more compact. Therefore, for example, a three-cylinder engine is adopted in the hybrid vehicle according to the present embodiment.

On the other hand, in order to drive the wheels with motive power from motor-generator 42-4, a motor-generator of higher power than motor-generators 42-1, 42-2 in the hybrid vehicle according to the first embodiment above is adopted as motor-generator 42-4 according to the second embodiment of the present invention.

This hybrid vehicle includes charging device 20, and this charging device 20 also includes charge plug 30 and conversion device 160.

Figure 6:
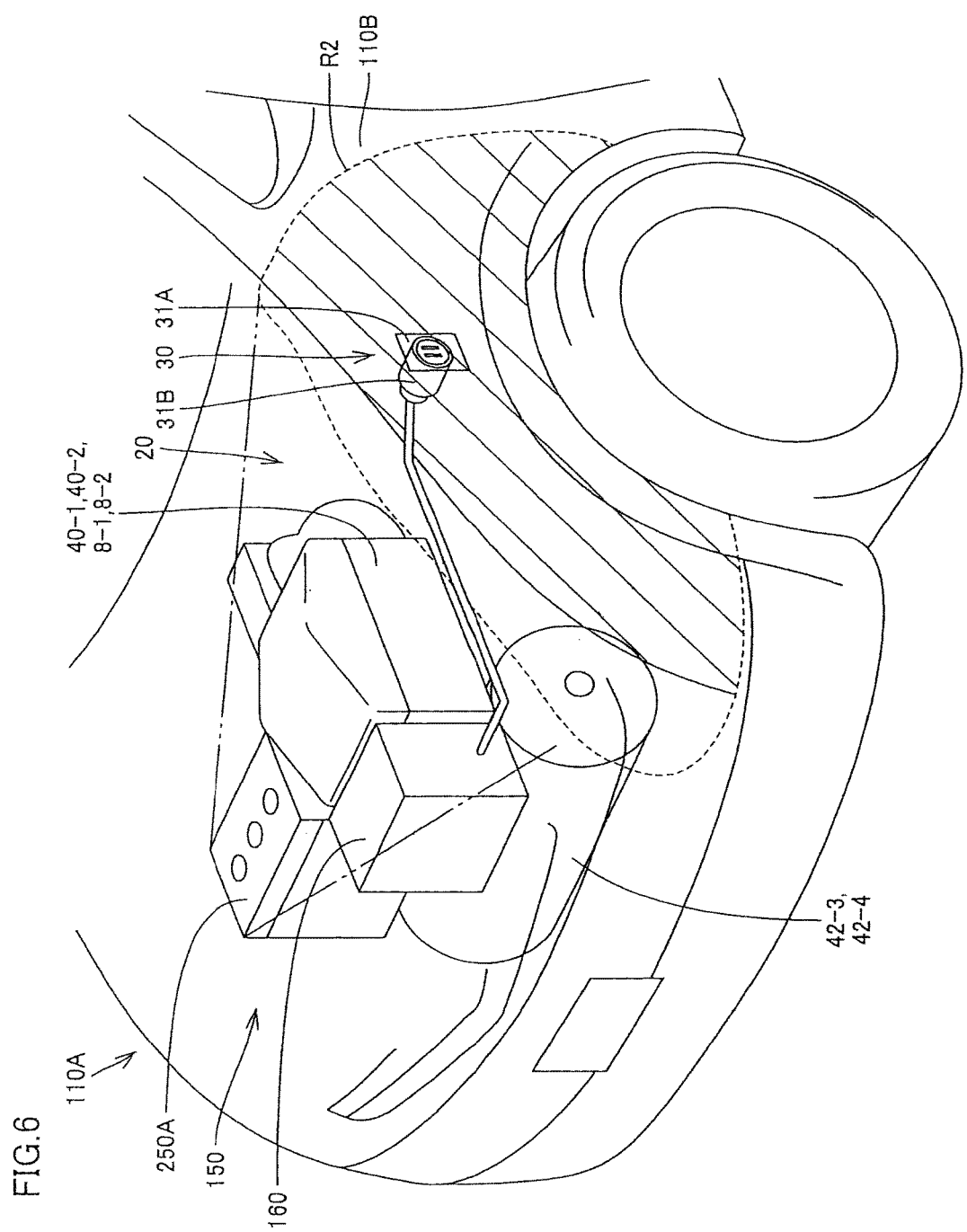
FIG. 6 is a schematic diagram schematically showing arrangement of each vehicle-mounted device shown in FIG. 5, in such a manner that the inside can be seen.

As shown in FIGS. 5 and 6, an accommodation case for accommodating motor-generators 42-3, 42-4 is arranged below the accommodation cases for accommodating inverters 40-1, 40-2 and converters 8-1, 8-2.

The accommodation case for accommodating motor-generators 42-3, 42-4 is placed, for example, between side members arranged in engine compartment 150.

Engine 250A is arranged at a position displaced toward the rear in terms of the direction of travel, above the accommodation case for accommodating motor-generators 42-3, 42-4, and arranged to be offset toward side surface 100A with respect to centerline O of the hybrid vehicle.

On the other hand, the accommodation cases for accommodating inverters 40-1, 40-2 and converters 8-1, 8-2 are arranged above the accommodation case for accommodating motor-generators 42-3, 42-4 and arranged to be offset toward side surface 100B with respect to centerline O.

In the present embodiment as well, charge plug 30 is provided in a portion of engine compartment sidewall portion 110B where a region R2 is located, that is, in the region where the accommodation case for accommodating conversion device 160 and the accommodation cases for accommodating inverters 40-1, 40-2 and converters 8-1, 8-2 are projected assuming that the accommodation case for accommodating conversion device 160 and the accommodation cases for accommodating inverters 40-1, 40-2 and converters 8-1, 8-2 are radially projected with engine 250 serving as a heat source.

In particular, in the hybrid vehicle according to the second embodiment of the present invention, engine 250A is smaller in size than the engine in the hybrid vehicle according to the first embodiment above. Accordingly, an amount of heat generation can be reduced and deterioration of charge plug 30 can be suppressed.

In addition, as compact engine 250A is mounted, an area of projection where the accommodation case for accommodating conversion device 160 and the accommodation cases for accommodating inverters 40-1, 40-2 and converters 8-1, 8-2 are projected on engine compartment sidewall portion 110B is greater and a wider area of region R2 can be ensured. Thus, a degree of freedom of a region where charge plug 30 is arranged can be enhanced.

In addition, by arranging compact engine 250A on the side of side surface 100A in engine compartment 150, a large space can be secured in a portion on the side of side surface 100B with respect to engine 250A. Thus, the accommodation case for accommodating conversion device 160 and the accommodation cases for accommodating inverters 40-1, 40-2 and converters 8-1, 8-2 can be accommodated at a distance from engine compartment sidewall portion 110B.

Thus, even when the accommodation case for accommodating conversion device 160 or the accommodation cases for accommodating inverters 40-1, 40-2 and converters 8-1, 8-2 vibrate(s), contact thereof with charge plug 30 can be suppressed and damage of charge plug 30 can be suppressed. As the three-cylinder engine is shorter than a four-cylinder engine or the like in a length in a direction in which combustion chambers are aligned, engine 250A and inverters 40-1, 40-2 and the like can be aligned in the direction of width of the vehicle and efficiency in mounting vehicle-mounted devices in engine compartment 150 can be improved. In addition, as engine 250A is more compact, a gap can be provided between vehicle-mounted devices and collision or the like between vehicle-mounted devices can also be suppressed.

A line electrically connecting connector main body 31B and conversion device 160 to each other is also disposed such that the accommodation cases for accommodating inverters 40-1, 40-2 and converters 8-1, 8-2 hide the line from engine 250A. Thus, deterioration of the line connected to charge plug 30 due to heat can be suppressed.

(Third Embodiment)

Figure 7:
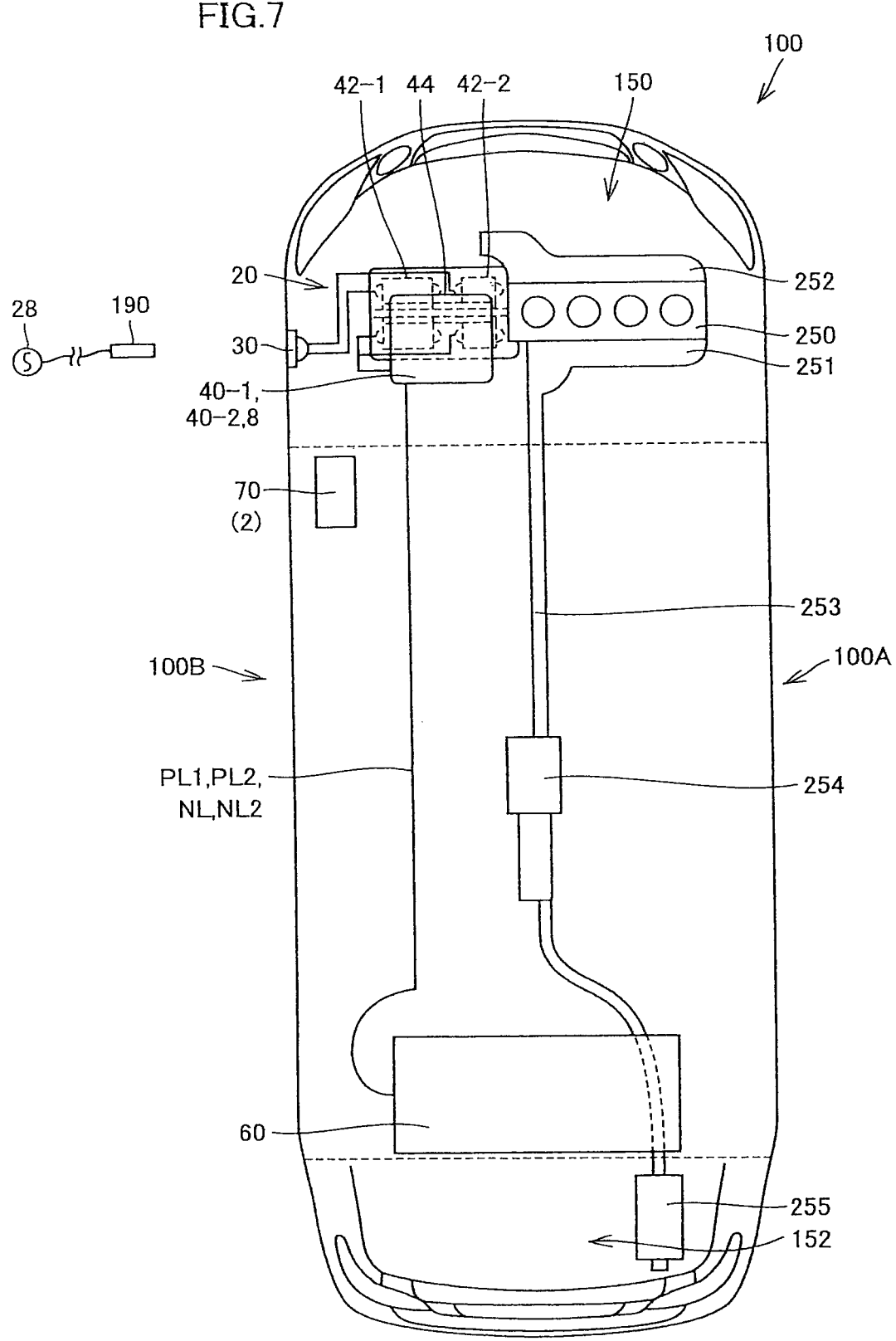
FIG. 7 is a plan view showing an overall structure of a hybrid vehicle according to a third embodiment of the present invention.
Figure 8:
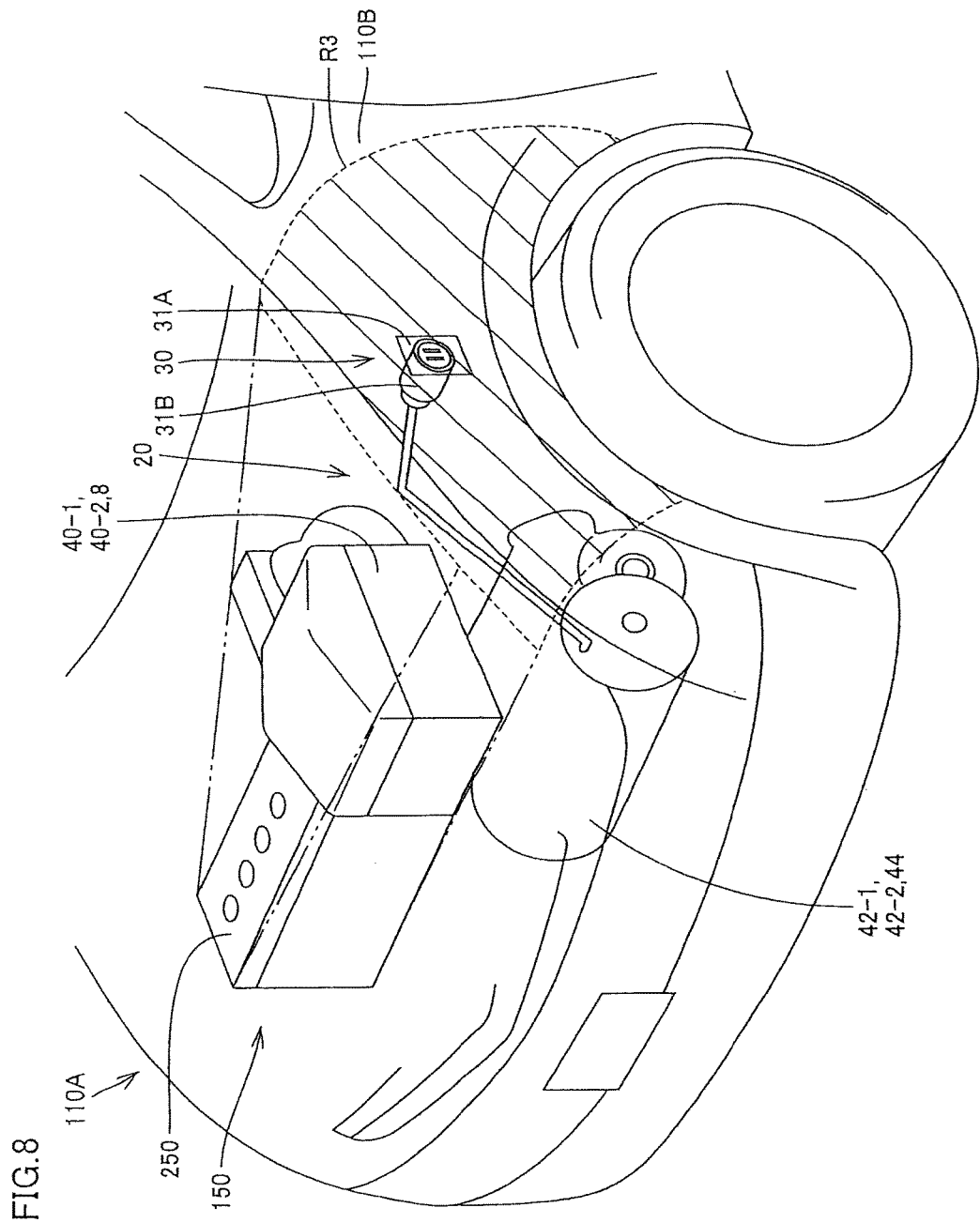
FIG. 8 is a schematic diagram showing arrangement of a vehicle-mounted device within the engine compartment.

A hybrid vehicle according to a third embodiment of the present invention will be described with reference to FIGS. 7 to 11. It is noted that features the same as or corresponding to those shown in FIGS. 1 to 6 above have the same reference numerals allotted and description thereof may not be provided. FIG. 7 is a plan view showing an overall structure of the hybrid vehicle according to the third embodiment of the present invention, and FIG. 8 is a schematic diagram showing arrangement of a vehicle-mounted device within engine compartment 150. In addition, FIG. 9 is an electric circuit diagram of the hybrid vehicle according to the present embodiment.

Figure 9:
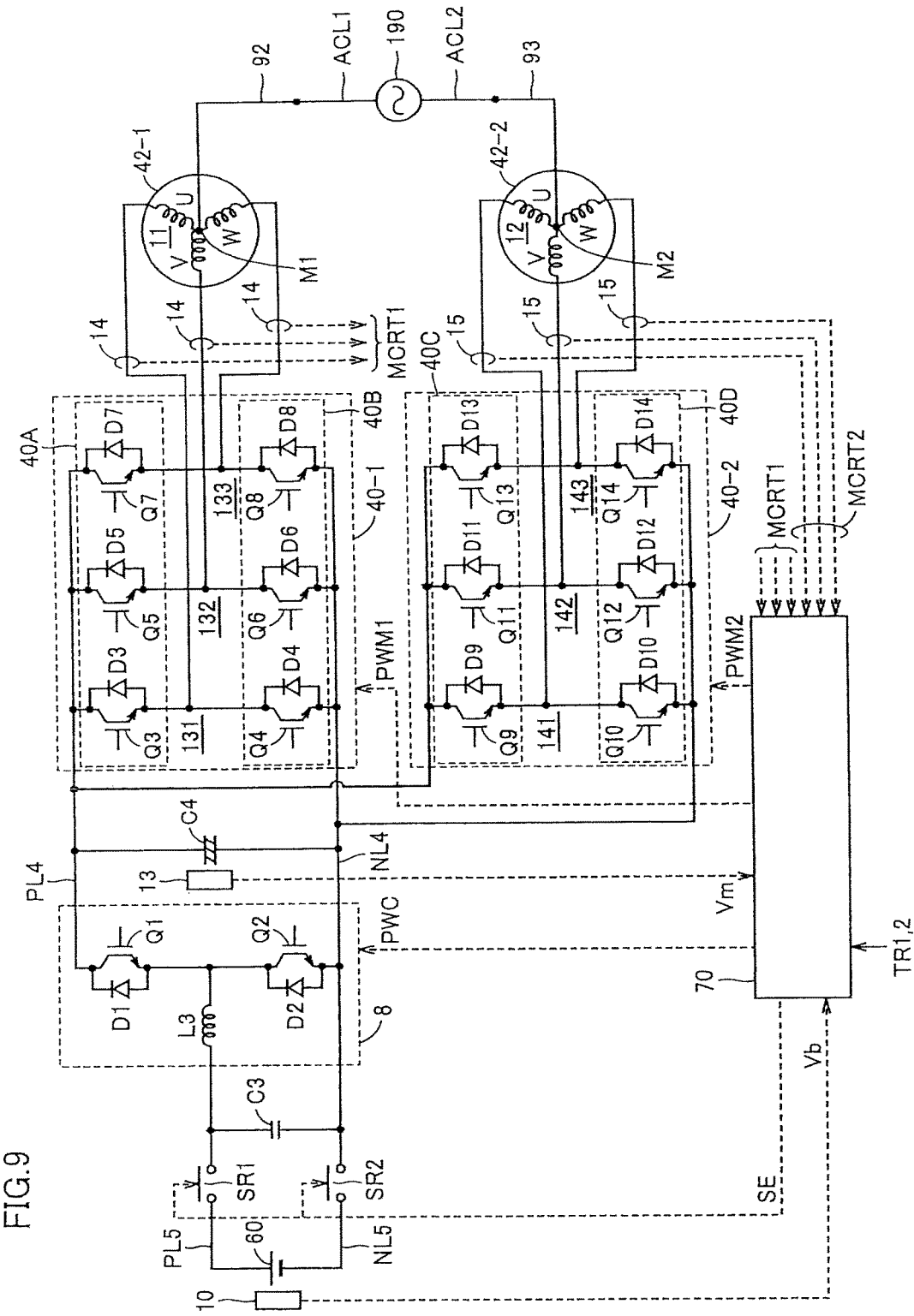
FIG. 9 is an electric circuit diagram of the hybrid vehicle according to the third embodiment of the present invention.

Here, as shown in FIGS. 7 to 9, a line connected to charge plug 30, through which electric power supplied through connector 190 flows, is connected to each neutral point of motor-generator 42-1, 42-2. Namely, unlike the hybrid vehicles according to the first and second embodiments above, in the hybrid vehicle according to the third embodiment of the present invention, power storage device 60 can be charged through each motor-generator 42-1, 42-2, without separately providing a conversion device.

Here, a charging and power feed operation of the hybrid vehicle according to the third embodiment of the present invention will be described with reference to FIG. 9.

A method of charging power storage device 60 with an AC current through connector 190 will be described with reference to FIG. 9. Power storage device 60 has a positive electrode connected to a positive electrode line PL5 and a negative electrode connected to a negative electrode line NL5. A capacitor C3 is connected between positive electrode line PL5 and negative electrode line NL5. A boost converter 8 is connected between positive electrode line PL5, negative electrode line NL5 and a positive electrode line PL4, a negative electrode line NL4. A capacitor C4 is connected between positive electrode line PL4 and negative electrode line NL4. Inverter 40-1 is connected between positive electrode line PL4, negative electrode line NL4 and motor-generator 42-1. Inverter 40-2 is connected between positive electrode line PL4, negative electrode line NL4 and motor-generator 42-2.

Motor-generator 42-1 includes a three-phase coil 11 as a stator coil and motor-generator 42-2 includes a three-phase coil 12 as a stator coil.

Boost converter 8 includes a reactor L3, NPN transistors Q1, Q2, and diodes D1, D2. Reactor L3 has one end connected to positive electrode line PL5 and the other end connected to an intermediate point between NPN transistor Q1 and NPN transistor Q2, that is, between an emitter of NPN transistor Q1 and a collector of NPN transistor Q2. NPN transistors Q1, Q2 are connected in series between positive electrode line PL5 and negative electrode line NL4. NPN transistor Q1 has a collector connected to positive electrode line PL4 of inverter 40-1 and NPN transistor Q2 has an emitter connected to negative electrode lines NL4, NL5. In addition, diodes D1, D2 that permit flow of a current from the emitter side to the collector side are arranged between the collectors and the emitters of NPN transistors Q1, Q2, respectively.

Inverter 40-1 includes a U-phase arm 131, a V-phase arm 132, and a W-phase arm 133. U-phase arm 131, V-phase arm 132, and W-phase arm 133 are provided in parallel between positive electrode line PL4 and negative electrode line NL4.

U-phase arm 131 includes NPN transistors Q3, Q4 connected in series, V-phase arm 132 includes NPN transistors Q5, Q6 connected in series, and W-phase arm 133 includes NPN transistors Q7, Q8 connected in series. In addition, diodes D3 to D8 that permit flow of a current from the emitter side to the collector side are connected between collectors and emitters of NPN transistors Q3 to Q8, respectively.

An intermediate point of the arm of each phase of inverter 40-1 is connected to an end of each phase of the coil of each phase of three-phase coil 11 included in motor-generator 42-1. Namely, motor-generator 42-1 is a three-phase permanent magnet motor, and it is configured such that one ends of three coils of U-, V-, and W-phases are commonly connected to a neutral point M1. The U-phase coil has the other end connected to the intermediate point between NPN transistors Q3, Q4, the V-phase coil has the other end connected to the intermediate point between NPN transistors Q5, Q6, and the W-phase coil has the other end connected to the intermediate point between NPN transistors Q7, Q8.

Inverter 40-1 and inverter 40-2 are connected to opposing ends of capacitor C4, in parallel to each other. Inverter 40-2 includes a U-phase arm 141, a V-phase arm 142, and a W-phase arm 143. U-phase arm 141, V-phase arm 142, and W-phase arm 143 are provided in parallel between positive electrode line PL4 and negative electrode line NL4.

U-phase arm 141 includes NPN transistors Q9, Q10 connected in series, V-phase arm 142 includes NPN transistors Q11, Q12 connected in series, and W-phase arm 143 includes NPN transistors Q13, Q14 connected in series. NPN transistors Q9 to Q14 correspond to NPN transistors Q3 to Q8 of inverter 40-1, respectively. Namely, inverter 40-2 is the same as inverter 40-1 in its configuration. Diodes D9 to D14 that permit flow of a current from the emitter side to the collector side are connected between collectors and emitters of NPN transistors Q9 to Q14, respectively.

An intermediate point of the arm of each phase of inverter 40-2 is connected to an end of each phase of the coil of each phase of three-phase coil 12 included in motor-generator 42-2. Namely, motor-generator 42-2 is also a three-phase permanent magnet motor, and it is configured such that one ends of three coils of U-, V-, and W-phases are commonly connected to a neutral point M2. The U-phase coil has the other end connected to the intermediate point between NPN transistors Q9, Q10, the V-phase coil has the other end connected to the intermediate point between NPN transistors Q11, Q12, and the W-phase coil has the other end connected to the intermediate point between NPN transistors Q13, Q14.

Power storage device 60 is implemented by a secondary battery such as a nickel-metal hydride battery or a lithium-ion battery. A voltage sensor 10 detects a battery voltage Vb output from power storage device 60 and outputs detected battery voltage Vb to HV_ECU 70. System relays SR1, SR2 are turned on and off in response to a signal SE from HV_ECU 70. More specifically, system relays SR1, SR2 are turned on in response to signal SE at H (logic high) level from HV_ECU 70 and turned off in response to signal SE at L (logic low) level from HV_ECU 70. Capacitor C3 smoothes a DC voltage supplied from power storage device 60 and supplies the smoothed DC voltage to boost converter 8.

Boost converter 8 boosts the DC voltage supplied from capacitor C3 and supplies the boosted DC voltage to capacitor C4. More specifically, receiving a signal PWC from HV_ECU 70, boost converter 8 boosts the DC voltage in accordance with a period during which NPN transistor Q2 was turned on in response to signal PWC, and supplies the resultant DC voltage to capacitor C4. Here, NPN transistor Q1 is turned off in response to signal PWC. Alternatively, boost converter 8 down-converts the DC voltage supplied from inverter 40-1 and/or inverter 40-2 through capacitor C4 in response to signal PWC from HV_ECU 70 and charges power storage device 60.

Capacitor C4 smoothes the DC voltage from boost converter 8 and supplies the smoothed DC voltage to inverters 40-1, 40-2. A voltage sensor 13 detects a voltage across opposing ends of capacitor C4, that is, an output voltage Vm of boost converter 8 (corresponding to a voltage input to inverters 40-1, 40-2; to be understood similarly hereinafter), and outputs detected output voltage Vm to HV_ECU 70.

Supplied with the DC voltage from capacitor C4, inverter 40-1 converts the DC voltage to an AC voltage based on a signal PWM1 from HV_ECU 70 and drives motor-generator 42-1. Thus, motor-generator 42-1 is driven to generate torque designated by a torque control value TR1. In addition, inverter 40-1 converts an AC voltage generated by motor-generator 42-1 during regenerative braking of the hybrid car including a motive power output device to a DC voltage based on signal PWM1 from HV_ECU 70 and supplies the resultant DC voltage to boost converter 8 through capacitor C4. It is noted that regenerative braking herein includes braking accompanying regeneration when a driver driving a hybrid car operates a foot brake, and deceleration (or stop of acceleration) of a vehicle while carrying out regeneration, in which an accelerator pedal is not pressed during running although a foot brake is not operated.

Supplied with the DC voltage from capacitor C4, inverter 40-2 converts the DC voltage to an AC voltage based on a signal PWM2 from HV_ECU 70 and drives motor-generator 42-2. Thus, motor-generator 42-2 is driven to generate torque designated by a torque control value TR2. In addition, inverter 40-2 converts an AC voltage generated by motor-generator 42-2 during regenerative braking of the hybrid car including a motive power output device to a DC voltage based on signal PWM2 from HV_ECU 70 and supplies the resultant DC voltage to boost converter 8 through capacitor C4.

A current sensor 14 detects a motor current MCRT1 that flows in motor-generator 42-1 and outputs detected motor current MCRT1 to HV_ECU 70. A current sensor 15 detects a motor current MCRT2 that flows in motor-generator 42-2 and outputs detected motor current MCRT2 to HV_ECU 70.

Here, in each inverter 40-1, 40-2 implemented by a three-phase bridge circuit, there are eight patterns of combination of on and off of six transistors. Among eight switching patterns, an interphase voltage attains to zero in two patterns, and such a voltage state is referred to as a zero-voltage vector. Regarding the zero-voltage vector, three transistors in an upper arm can be regarded as being in the same switching state (all on or all off), and three transistors in a lower arm can also be regarded as being in the same switching state. Therefore, FIG. 9 shows three transistors in the upper arm of inverter 40-1 collectively as an upper arm 40A and three transistors in the lower arm of inverter 40-1 collectively as a lower arm 40B. Similarly, three transistors in the upper arm of inverter 40-2 are collectively shown as an upper arm 40C and three transistors in the lower arm of inverter 40-2 are collectively shown as a lower arm 40D.

As shown in FIG. 9, a zero-phase equivalent circuit can be seen as a single-phase PWM converter receiving as input, single-phase AC electric power provided to neutral points M1, M2 through electric power input lines ACL1, ACL2 of connector 190 and lines 92, 93. Then, by varying the zero voltage vector in each of inverters 40-1, 40-2 and controlling switching of inverters 40-1, 40-2 to operate as the arm of the single-phase PWM converter, AC electric power from connector 190 input through electric power input lines ACL1, ACL2 connected to charge plug 30 can be converted to DC electric power and output to positive electrode line PL4. The resultant DC voltage is supplied to boost converter 8 through capacitor C4 and power storage device 60 is charged.

Figure 10:
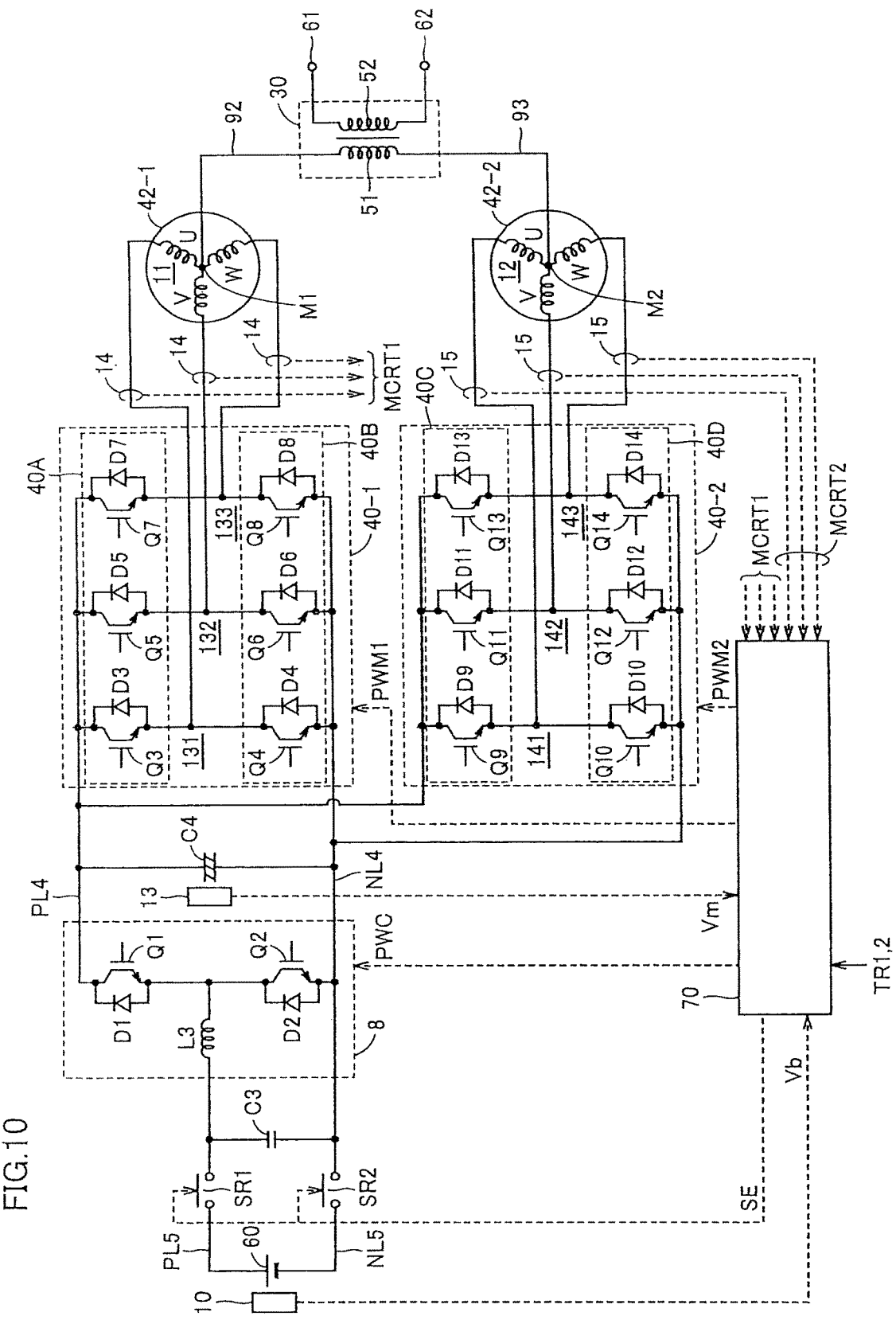
FIG. 10 is an electric circuit diagram of the hybrid vehicle according to the third embodiment of the present invention.

FIG. 10 is an electric circuit diagram of the hybrid vehicle according to the present embodiment, and in the hybrid vehicle shown in FIG. 10, electric power stored in power storage device 60 can be supplied to an external AC power supply through the connector connected to charge plug 30.

Here, in this vehicle, connector 190 connected to charge plug 30 is a connector for external power feed capable of supplying electric power charged to power storage device 60 to an external load.

The connector for external power feed is a connector for supplying electric power from the hybrid vehicle (for example, single-phase AC 100V in Japan) to an external load.

Inverters 40-1, 40-2 drive respective motor-generators 42-1, 42-2 such that DC electric power supplied from power storage device 60 through boost converter 8 is converted to AC electric power for commercial power supply in response to signals PWM1, PWM2 from HV_ECU 70 and the AC electric power can be output from charge plug 30.

Charge plug 30 includes a primary coil 51 and a secondary coil 52. Primary coil 51 is connected between neutral point M1 of three-phase coil 11 included in motor-generator 42-1 and neutral point M2 of three-phase coil 12 included in motor-generator 42-2. An AC voltage generated across neutral point M1 of motor-generator 42-1 and neutral point M2 of motor-generator 42-2 is converted to an AC voltage for commercial power supply, which is output from terminals 61, 62 of charge plug 30.

Thus, in the hybrid vehicle according to the third embodiment of the present invention, motor-generators 42-1, 42-2 are used to attain charging and power feed and a conversion device is not mounted, because a conversion device for charging and power feed is not necessary. In the present embodiment, two neutral points are used so that a battery can be charged and electric power can be supplied to an external load through connector 190, however, a single neutral point may be used so that a battery is charged and electric power is supplied to an external load.

The number of vehicle-mounted devices to be accommodated in engine compartment 150 can thus be decreased, and a distance between accommodated devices can be ensured. For example, contact of charge plug 30 with the accommodation case for accommodating inverters 40-1, 40-2 or the like can thus be suppressed and damage of charge plug 30 can be suppressed.

In addition, as shown in FIG. 8, in the present embodiment as well, the accommodation cases for accommodating inverters 40-1, 40-2 and converter 8 are arranged at a position adjacent to engine 250 on the side of engine compartment sidewall portion 110B, as in the first and second embodiments above.

As shown in FIG. 8, charge plug 30 according to the third embodiment of the present embodiment is also provided in a portion of engine compartment sidewall portion 110B where a region R3 is located, that is, in the region where the accommodation cases for accommodating inverters 40-1, 40-2 and converter 8 are projected with engine 250 serving as a heat source emitting radial heat wave.

Thus, transfer of heat from engine 250 to charge plug 30 is suppressed and deterioration of charge plug 30 due to heat can be suppressed.

In the third embodiment of the present invention as well, the accommodation case for accommodating motor-generators 42-1, 42-2 and powertrain 44 is arranged below the accommodation cases for accommodating inverters 40-1, 40-2 and converter 8, and it is arranged closer to engine compartment sidewall portion 110B relative to engine compartment sidewall portion 110A.

In addition, as shown in FIG. 7, when viewed two-dimensionally, the accommodation case for accommodating motor-generators 42-1, 42-2 and powertrain 44 is arranged on the side of engine compartment sidewall portion 110B with respect to engine 250.

Here, charge plug 30 may be arranged within a region where the accommodation case for accommodating motor-generators 42-1, 42-2 and the like is projected on engine compartment sidewall portion 110B with engine 250 serving as a heat source emitting radial heat wave.

Figure 11:
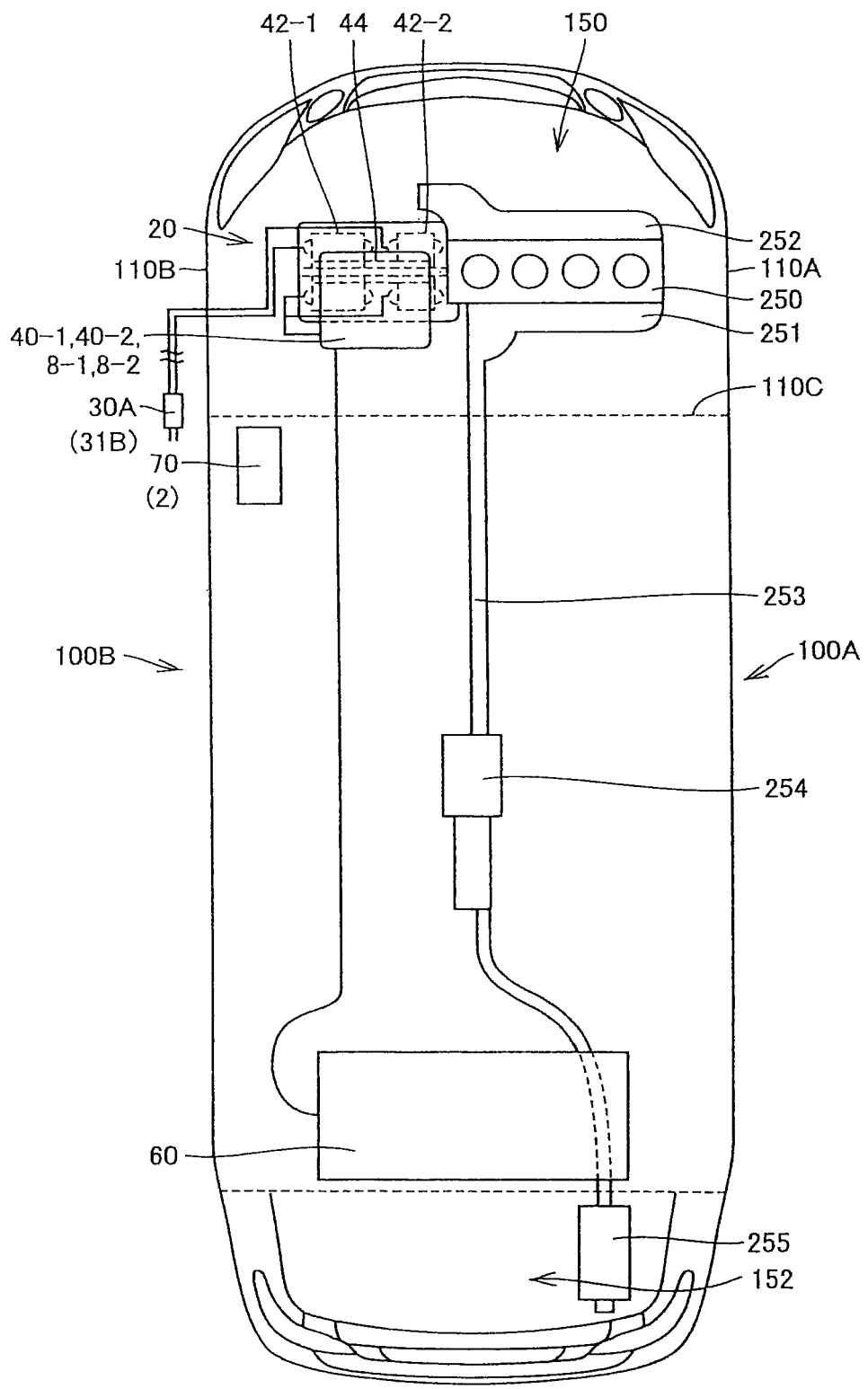
FIG. 11 is a diagram showing a variation of the hybrid vehicle according to the third embodiment of the present invention.

FIG. 11 shows a variation of the hybrid vehicle according to the third embodiment of the present invention. As shown in FIG. 11, a charge plug 30A includes connector main body 31B that can be accommodated in and drawn out of the vehicle main body and a line connected to connector main body 31B.

The line connected to connector main body 31B can be accommodated in the vehicle main body and also can be drawn out of the vehicle main body by drawing out connector main body 31B.

Thus, according to charge plug 30A, charge plug 30A can directly be connected to a household power supply or the like.

(Fourth Embodiment)

A hybrid vehicle according to a fourth embodiment of the present invention will be described with reference to FIGS. 12 and 13. It is noted that features the same as or corresponding to those shown in FIGS. 1 to 11 above have the same reference numerals allotted and description thereof may not be provided.

Figure 12:
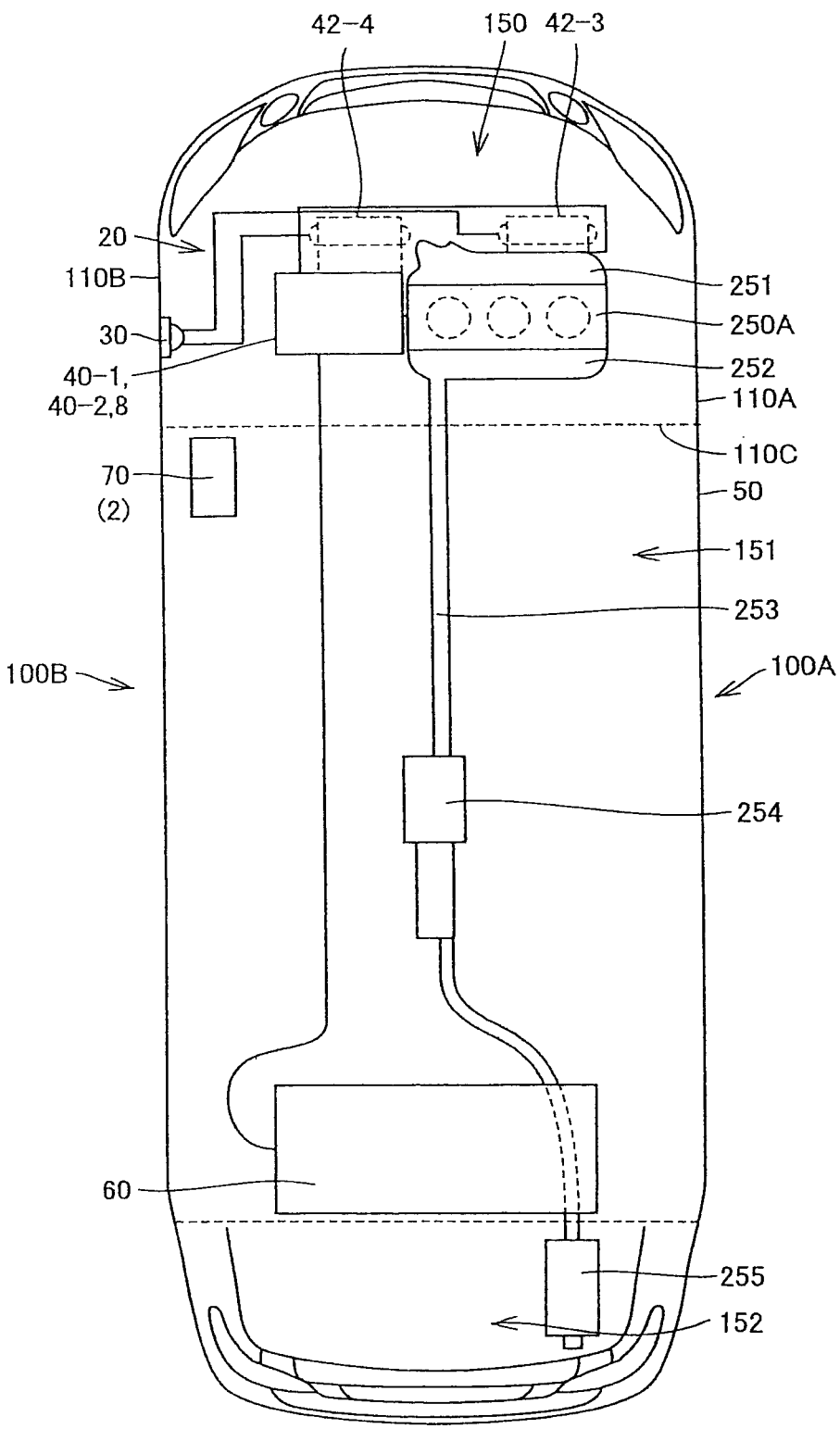
FIG. 12 is a plan view showing an overall structure of a hybrid vehicle according to a fourth embodiment of the present invention.

FIG. 12 is a plan view showing an overall structure of the hybrid vehicle according to the fourth embodiment of the present invention. FIG. 13 is a schematic diagram schematically showing arrangement of each vehicle-mounted device in the hybrid vehicle according to the present embodiment.

As shown in FIG. 12, the hybrid vehicle according to the fourth embodiment of the present invention is what is called a series hybrid type hybrid vehicle. Engine 250A generates motive power for driving motor-generator 42-3, and electric power generated by motor-generator 42-3 is supplied to motor-generator 42-4 through inverters 40-1, 40-2 or the like so that motor-generator 42-4 is driven.

Therefore, in the fourth embodiment of the present invention as well, a compact engine is adopted as in the hybrid vehicle according to the second embodiment above.

In the hybrid vehicle according to the fourth embodiment of the present invention as well, engine 250A is arranged to be offset toward engine compartment sidewall portion 110A with respect to centerline O, and contact between charge plug 30 and the accommodation cases for accommodating inverters 40-1, 40-2 and converter 8 can be suppressed.

In addition, in the present embodiment as well, the line connected to charge plug 30 is disposed such that the accommodation cases for accommodating inverters 40-1, 40-2 and converter 8 or the accommodation case for accommodating motor-generators 42-3, 42-4 hide(s) the line from engine 250A. Motor-generators 42-3, 42-4 are arranged below the accommodation cases for accommodating inverters 40-1, 40-2 and converter 8.

In the fourth embodiment of the present invention, as in the third embodiment above, the line connected to charge plug 30 is connected to each neutral point of each motor-generator 42-3, 42-4, and power storage device 60 can be charged through each motor-generator 42-3, 42-4.

In addition, in the present embodiment as well, as in the hybrid vehicle according to the third embodiment above, electric power stored in power storage device 60 can be supplied to an external AC power supply through charge plug 30.

Figure 13:
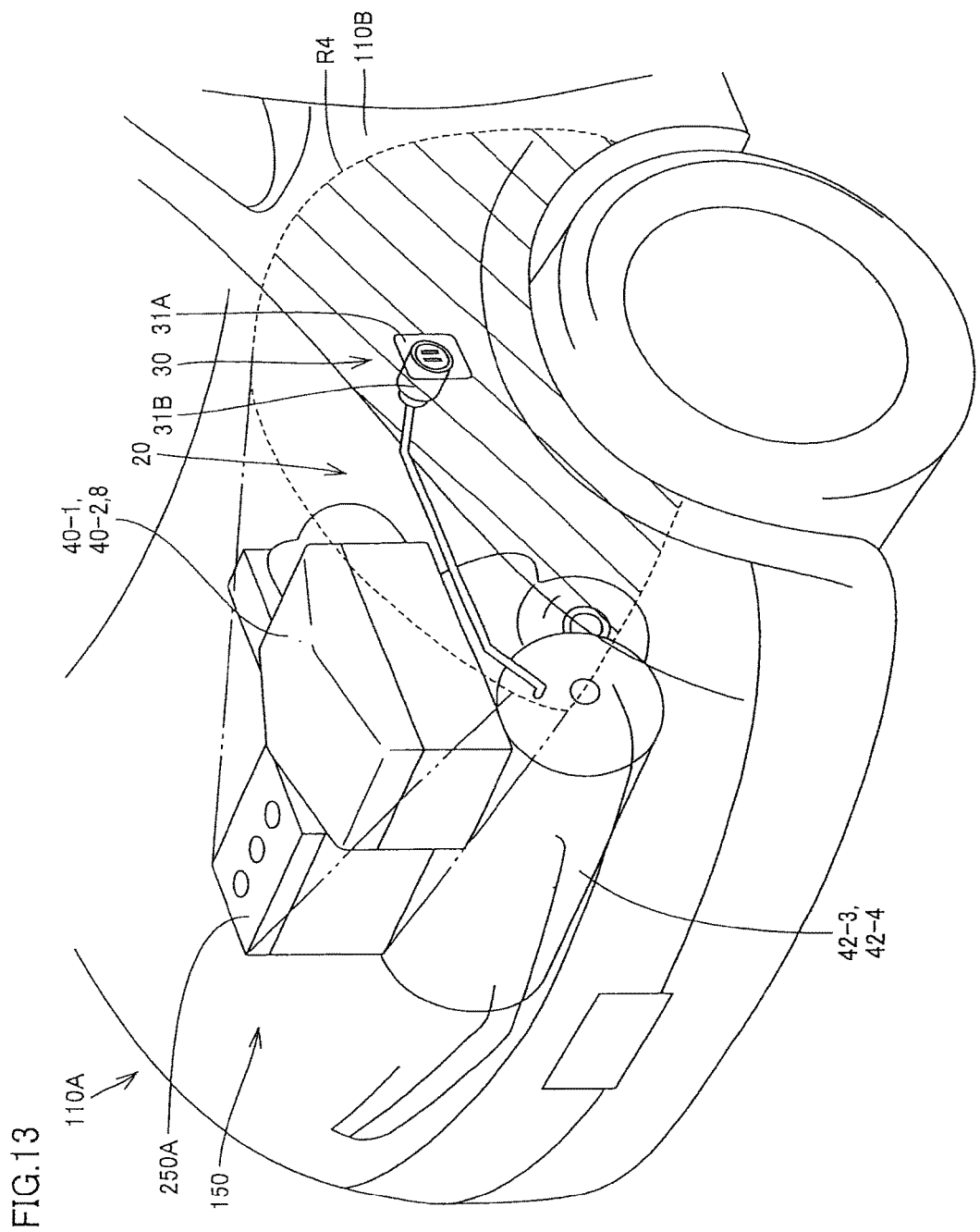
FIG. 13 is a schematic diagram schematically showing arrangement of each vehicle-mounted device in the hybrid vehicle according to the fourth embodiment of the present invention.

As shown in FIG. 13, in the hybrid vehicle according to the fourth embodiment of the present invention, charge plug 30 is arranged in a portion where a region R4 is located when the accommodation cases for accommodating inverters 40-1, 40-2 and converter 8 are projected on engine compartment sidewall portion 110B with engine 250A serving as a heat source emitting radial heat wave.

In addition, in the present embodiment as well, charge plug 30 may be arranged in a region where the accommodation case for accommodating motor-generators 42-3, 42-4 and the like is projected on engine compartment sidewall portion 110B with engine 250A serving as a heat source emitting radial heat wave.

By thus arranging charge plug 30, heating of charge plug 30 by heat from engine 250A can be suppressed.

(Fifth Embodiment)

A hybrid vehicle according to a fifth embodiment of the present invention will be described with reference to FIG. 14. It is noted that features shown in FIG. 14 the same as or corresponding to those shown in FIGS. 1 to 13 above have the same reference numerals allotted and description thereof may not be provided.

Figure 14:
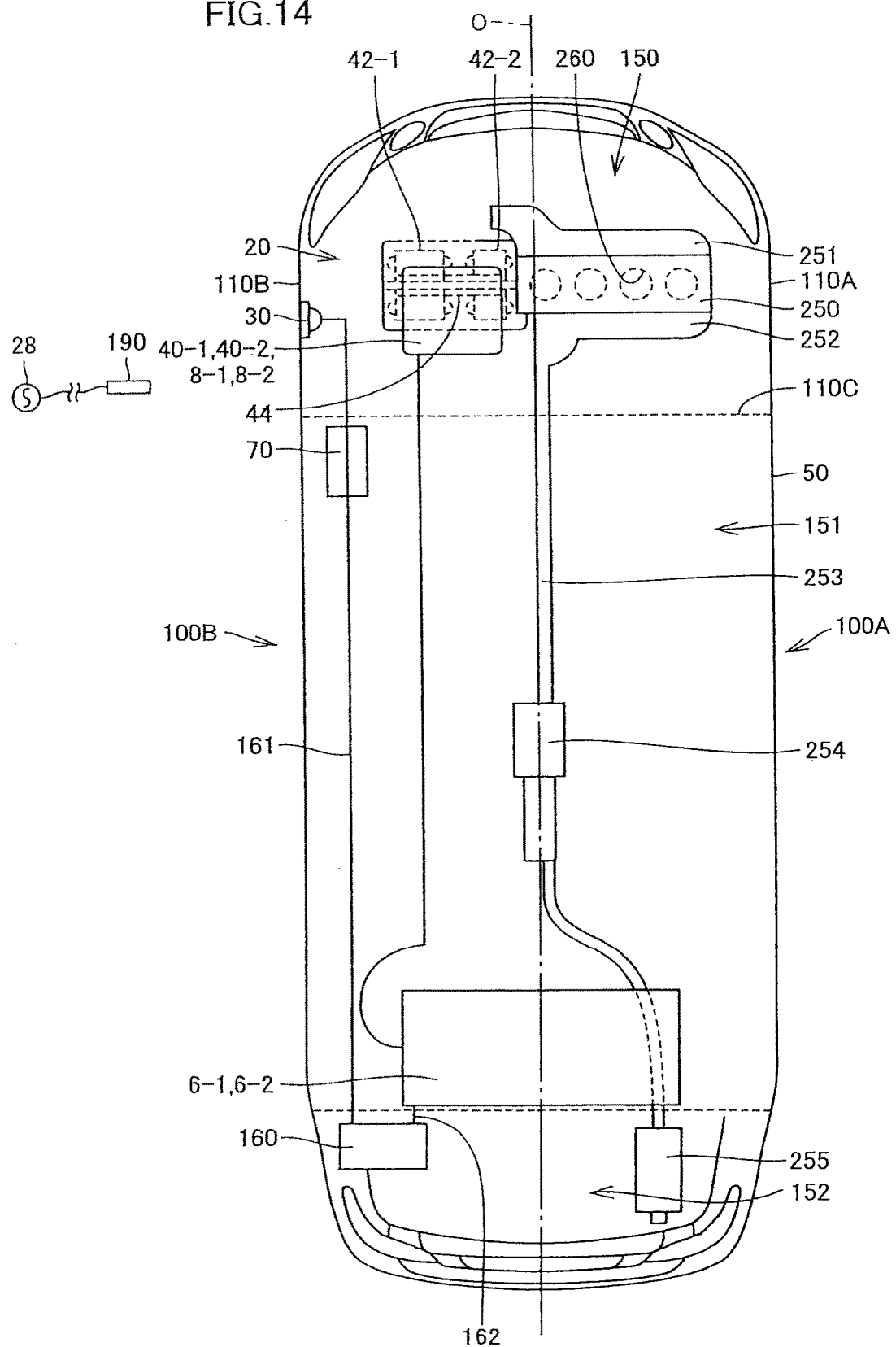
FIG. 14 is a plan view showing an overall structure of a hybrid vehicle according to a fifth embodiment of the present invention.

FIG. 14 is a plan view showing an overall structure of the hybrid vehicle according to the present fifth embodiment. The hybrid vehicle shown in FIG. 14 includes conversion device 160 connected to charge plug 30 through a line 161 and connected to power storage devices 6-1, 6-2 through a line 162. Conversion device 160 is capable of at least one of conversion of DC electric power from power storage devices 6-1, 6-2 to AC electric power for supply of the AC electric power to an external load through charge plug 30 and conversion of AC electric power supplied through connector 190 connected to charge plug 30 to DC electric power for charging of power storage devices 6-1, 6-2.

Namely, conversion device 160 has at least one of a DC/AC function and an AC/DC function. It is noted that conversion device 160 may additionally have a DC/DC function.

Here, conversion device 160 can convert DC electric power at approximately 200V to 300V charged to power storage devices 6-1, 6-2, for example, to DC electric power around 10V for supply to the outside, or it can convert DC electric power supplied from the outside to DC electric power that can be supplied to the battery (a DC current at approximately 200V to 300V) for charging of power storage devices 6-1, 6-2.

Such conversion device 160 is mounted at a position distant from engine compartment 150 containing engine 250. Thus, an amount of heat provided from engine 250 to conversion device 160 can be lowered and heat-resistance treatment for conversion device 160 can be simplified.

In the example shown in FIG. 14, conversion device 160 is incorporated in luggage room 152 and driver and/or passenger accommodation chamber 151 is located between luggage room 152 and engine compartment 150, so that conversion device 160 is hardly affected by heat from engine 250. In addition, by incorporating conversion device 160 in luggage room 152, a capacity of driver and/or passenger accommodation chamber 151 can be ensured.

Power storage devices 6-1, 6-2 are arranged, for example, in the rear of a back seat in driver and/or passenger accommodation chamber 151. Therefore, a distance between conversion device 160 and luggage room 152 can be decreased by incorporating conversion device 160 in luggage room 152 and line 162 connecting conversion device 160 and power storage devices 6-1, 6-2 to each other can be shorter. It is noted that power storage devices 6-1, 6-2 may be incorporated in luggage room 152.

By incorporating conversion device 160 at a position distant from engine compartment 150 as described above, a space for mounting other devices in engine compartment 150 can be secured.

Charge plug 30 and conversion device 160 are connected to each other through line 161, and only line 161 of charging device 20 is located within engine compartment 150.

As line 161 can be wired if only a small space is available, efficiency in mounting devices in engine compartment 150 can be improved by disposing line 161 in the space between devices mounted in engine compartment 150.

In addition, by arranging line 161 between the devices, an amount of heat provided from engine 250 to line 161 can be lowered and heat-resistance treatment for line 161 can be simplified.

Conversion device 160 is mounted on the side of engine compartment sidewall portion 110B relative to engine compartment sidewall portion 110A in the direction of width of the vehicle. Thus, line 161 can extend along side surface 100B or can be disposed in the vicinity of side surface 100B, and line 161 can be arranged at a position distant from engine 250. Thus, deterioration of line 161 due to heat from engine 250 can be suppressed.

Figure 15:
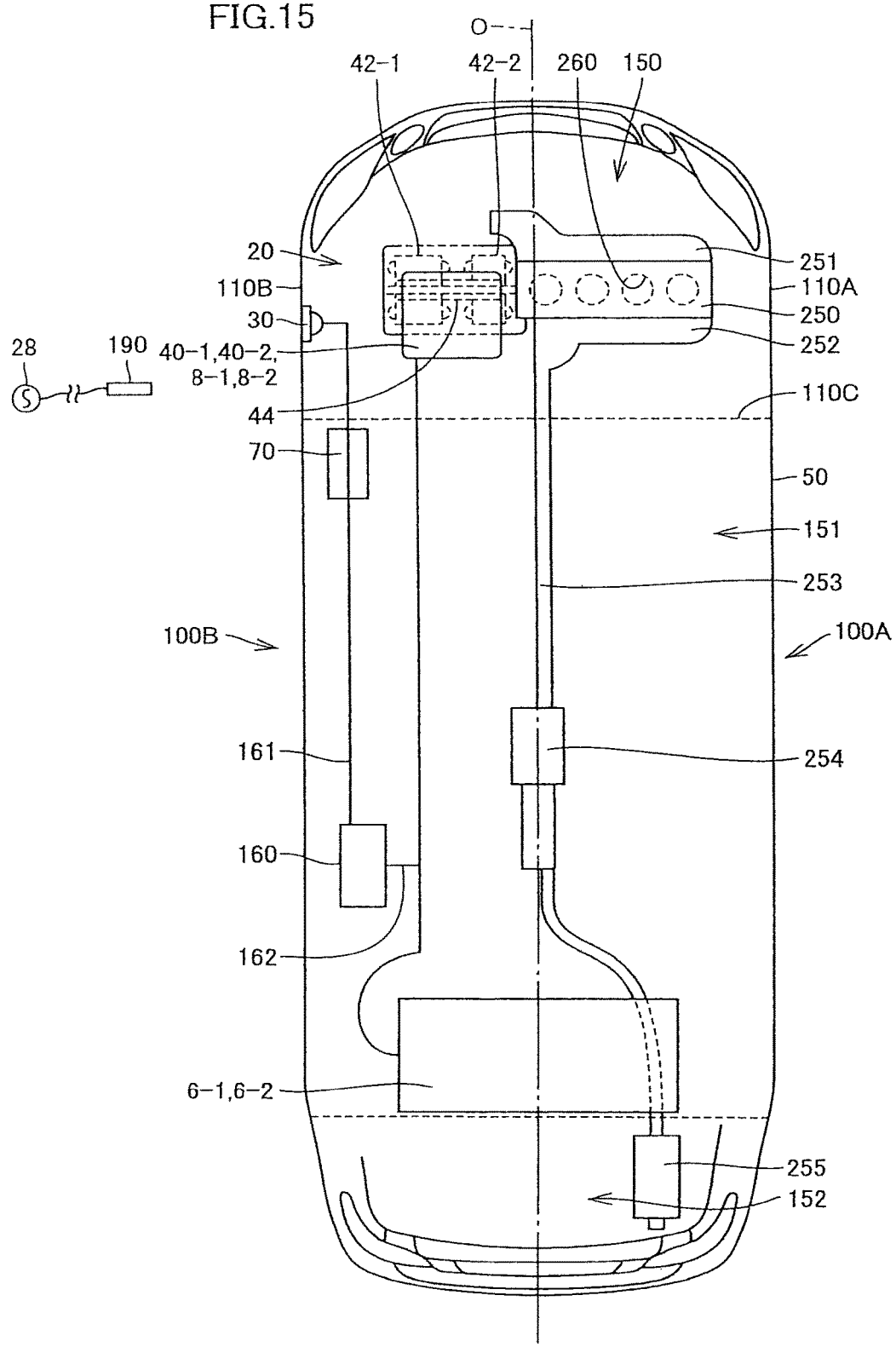
FIG. 15 is a plan view showing a variation of the hybrid vehicle according to the fifth embodiment of the present invention.

Though conversion device 160 is incorporated in luggage room 152 in the example shown in FIG. 14 above, a position thereof is not limited as such, and it may be incorporated in driver and/or passenger accommodation chamber 151 as shown in FIG. 15. By incorporating conversion device 160 in driver and/or passenger accommodation chamber 151, a distance between conversion device 160 and power storage devices 6-1, 6-2 can be decreased, a length of line 161 and line 162 can be shorter, and reduction in current loss can be achieved. In order to efficiently use a space in driver and/or passenger accommodation chamber 151, conversion device 160 is preferably arranged under a seat.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

INDUSTRIAL APPLICABILITY

The present invention is applicable to a hybrid vehicle and suitable for a hybrid vehicle driven by fuel and electric power.

What is claimed is:

1. A vehicle, comprising:
an internal combustion engine driven by fuel;
a drive source driven by an energy source different from said fuel;
an energy source storage portion that stores said energy source;
an energy source supply portion to which an external connection portion is removably connected, for at least one of being supplied with said energy source from said external connection portion and supplying said energy source to said external connection portion;
a vehicle-mounted device arranged adjacent to said internal combustion engine,
an internal combustion engine accommodation portion for accommodating said internal combustion engine,
the internal combustion engine accommodation portion including a first side surface and a second side surface extending in a longitudinal direction of the vehicle and aligned with each other in a parallel fashion,
said internal combustion engine being arranged closer to the first side surface relative to the second side surface in the internal combustion engine accommodation portion,
said internal combustion engine being a heat source that emits irradiation on said vehicle-mounted device to form a projection region on said second side surface, the projection region being a region substantially in-line with said internal combustion engine and said vehicle-mounted device where direct heat irradiation from said internal combustion engine onto said second side surface ispartially blocked by said vehicle-mounted device; and
said energy source supply portion being arranged within said projection region in the second side surface.

2. The vehicle according to claim 1, wherein
said energy source is electric power, said energy source storage portion is a battery that stores and discharges electric power,
said drive source is a first rotating electric machine,
said vehicle further comprises a second rotating electric machine,
driving wheels are driven only by the first rotating electric machine, and
said second rotating electric machine generates electric power by using motive power of said internal combustion engine and charging said battery or driving said first rotating electric machine by using the generated electric power.

3. The vehicle according to claim 2, wherein said internal combustion engine is a 3-cylinder engine.

4. The vehicle according to claim 1, wherein
said energy source is electric power,
said drive source is a rotating electric machine having a polyphase winding and a neutral point of the polyphase winding,
said energy source storage portion is a battery,
said vehicle further comprises an inverter connected to said rotating electric machine and an inverter control portion that controls driving of said inverter,
said energy source supply portion includes a line connected to said neutral point, and
said inverter control portion controls said inverter such that AC electric power provided to said neutral point is converted to DC electric power for supply to said battery.

5. The vehicle according to claim 4, wherein
said rotating electric machine includes a first rotating electric machine having a first polyphase winding and a first neutral point of the first polyphase winding and a second rotating electric machine having a second polyphase winding and a second neutral point of the second polyphase winding,
said energy source supply portion includes a first line connected to said first neutral point and a second line connected to said second neutral point,
said inverter includes a first inverter for converting DC electric power from said battery to AC electric power and supplying the AC electric power to said first rotating electric machine and a second inverter for converting DC electric power from said battery to AC electric power and supplying the AC electric power to said second rotating electric machine, and
said inverter control portion controls said first inverter and said second inverter such that AC electric power provided to said first neutral point and said second neutral point is converted to DC electric power for supply to said battery.

6. The vehicle according to claim 1, wherein
said energy source is electric power,
said drive source is a rotating electric machine having a polyphase winding and a neutral point of the polyphase winding,
said energy source storage portion is a battery,
said vehicle further comprises an inverter connected to said rotating electric machine and an inverter control portion that controls drive of said inverter,
said energy source supply portion includes a line connected to said neutral point, and
said inverter control portion controls said inverter such that DC electric power supplied from said battery to said inverter is converted to AC electric power for supply from said energy source supply portion to an external load.

7. The vehicle according to claim 6, wherein
said rotating electric machine includes a first rotating electric machine having a first polyphase winding and a first neutral point of the first polyphase winding and a second rotating electric machine having a second polyphase winding and a second neutral point of the second polyphase winding, said energy source supply portion includes a first line connected to said first neutral point and a second line connected to said second neutral point, said inverter includes a first inverter for converting DC electric power from said battery to AC electric power and supplying the AC electric power to said first rotating electric machine and a second inverter for converting DC electric power from said battery to AC electric power and supplying the AC electric power to said second rotating electric machine, and said inverter control portion controls said first inverter and said second inverter such that DC electric power supplied from said battery to said first inverter and said second inverter is converted to AC electric power for supply from said energy source supply portion to the external load.

8. The vehicle according to claim 1, wherein said energy source is electric power, said energy source storage portion is a battery, said vehicle further comprises a conversion device connected to said energy source supply portion and said battery, and said conversion device that at least one of converts electric power supplied from said energy source supply portion to DC electric power that is supplied to said battery for charging of said battery and converts DC electric power supplied from said battery for supply from said energy source supply portion to an external load.

9. The vehicle according to claim 8, wherein said conversion device is provided at a position distant from said internal combustion engine accommodation portion, and said vehicle further comprises a line connecting said conversion device and the energy source supply portion to each other and passing through said internal combustion engine accommodation portion.

10. The vehicle according to claim 9, further comprising a driver and/or passenger accommodation portion that accommodates a driver and/or a passenger, and a luggage storage portion located on a side opposite to said internal combustion engine accommodation portion, with respect to said driver and/or passenger accommodation portion, wherein said conversion device is arranged within said luggage storage portion.

11. A hybrid vehicle incorporating an internal combustion engine and a motor, the hybrid vehicle comprising:

a battery for supplying electric power for driving said motor to said motor;

an electric power reception portion electrically connected to said battery, the electric power reception portion is connected to a connector for supplying electric power from outside the hybrid vehicle to said hybrid vehicle;

a vehicle-mounted device arranged adjacent to said internal combustion engine; and an internal combustion engine accommodation portion for accommodating said internal combustion engine, wherein the internal combustion engine accommodation portion has a first side surface and a second side surface, the first side surface located opposite to the second side surface, said internal combustion engine being arranged to be offset toward the first side surface with respect to a centerline passing through a center in a direction of width of said hybrid vehicle, and said internal combustion engine being a heat source that emits irradiation on said vehicle-mounted device to form a projection region on said second side surface, the projection region being a region substantially in-line with said internal combustion engine and said vehicle-mounted device where direct heat irradiation from said internal combustion engine onto said second side surface is partially blocked by said vehicle-mounted device; and said electric power reception portion being arranged within said projection region in the second side surface.

* * * * *